US012003787B2

(12) United States Patent
Rosewarne

(10) Patent No.: US 12,003,787 B2
(45) Date of Patent: Jun. 4, 2024

(54) METHOD, APPARATUS AND SYSTEM FOR ENCODING AND DECODING A TREE OF BLOCKS OF VIDEO SAMPLES

(71) Applicant: CANON KABUSHIKI KAISHA, Tokyo (JP)

(72) Inventor: Christopher James Rosewarne, Concord West (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/157,546

(22) Filed: Jan. 20, 2023

(65) Prior Publication Data

US 2023/0164364 A1 May 25, 2023

Related U.S. Application Data

(63) Continuation of application No. 17/276,650, filed as application No. PCT/AU2019/050658 on Jun. 25, 2019, now Pat. No. 11,595,699.

(30) Foreign Application Priority Data

Sep. 21, 2018 (AU) ................................ 2018233042

(51) Int. Cl.
*H04N 19/96* (2014.01)
*H04N 19/117* (2014.01)
(Continued)

(52) U.S. Cl.
CPC ........... *H04N 19/96* (2014.11); *H04N 19/117* (2014.11); *H04N 19/119* (2014.11);
(Continued)

(58) Field of Classification Search
CPC .... H04N 19/96; H04N 19/117; H04N 19/119; H04N 19/122; H04N 19/132; H04N 19/176; H04N 19/186
See application file for complete search history.

(56) References Cited

U.S. PATENT DOCUMENTS

2015/0288974 A1 10/2015 Rubinstein
2019/0281297 A1* 9/2019 Lee ....................... H04N 19/157

FOREIGN PATENT DOCUMENTS

CN 105472389 A 4/2016
EP 2908524 A1 8/2015
(Continued)

OTHER PUBLICATIONS

Benjamin Bross, et al., Versatile Video Coding (Draft 2), Joint Video Experts Team (JVET) of ITU-T SG 16 WP 3 and ISO/IEC JTC 1/SC 29/WG 11, 11th Meeting, Ljubljana, SI, Jul. 10-18, 2018, Doc. No. JVET-K1001-v5.

(Continued)

*Primary Examiner* — Neil R Mikeska
(74) *Attorney, Agent, or Firm* — Canon U.S.A., Inc. IP Division

(57) ABSTRACT

A method of decoding coding blocks of a coding tree unit in an image. The method comprises obtaining the coding tree unit in the image from a bitstream, the coding tree unit having chroma channels and a luma channel; and determining luma split options for the luma channel of the coding tree unit according to dimensions of a region of the coding tree unit. The method also comprises determining chroma split options for the chroma channels of the coding tree unit according to dimensions of a region of the coding tree unit, the chroma split options being different to the luma split options, the allowable chroma split options resulting in chroma intra predicted blocks with a minimum size of 16 samples; and decoding the coding blocks by determining flags from the bitstream to select one of the determined luma split options and one of the determined chroma split options.

14 Claims, 14 Drawing Sheets

(51) Int. Cl.
*H04N 19/119* (2014.01)
*H04N 19/122* (2014.01)
*H04N 19/132* (2014.01)
*H04N 19/176* (2014.01)
*H04N 19/186* (2014.01)

(52) U.S. Cl.
CPC ......... *H04N 19/122* (2014.11); *H04N 19/132* (2014.11); *H04N 19/176* (2014.11); *H04N 19/186* (2014.11)

(56) References Cited

FOREIGN PATENT DOCUMENTS

| | | |
|---|---|---|
| IN | 201727019476 A | 8/2017 |
| KR | 10-2014-0139562 A | 12/2014 |
| WO | 2004002298 A1 | 1/2004 |
| WO | 2013102293 A1 | 7/2013 |
| WO | 2015108793 A1 | 7/2015 |
| WO | 2018075287 A1 | 4/2018 |

OTHER PUBLICATIONS

Shen G Lei, et al., Design and realization of real-time video-processing platform based on DSP and FPGA, Journal of University of Science and Technology of China, vol. 36, No. 3, Mar. 2006.

\* cited by examiner

METHOD, APPARATUS AND SYSTEM FOR ENCODING AND DECODING A TREE OF BLOCKS OF VIDEO SAMPLES

REFERENCE TO RELATED APPLICATION(S)

This application is a continuation of U.S. patent application Ser. No. 17/276,650, filed on Mar. 16, 2021, which is the National Phase application of PCT Application No. PCT/AU2019/050658, filed on Jun. 25, 2019 and titled "METHOD, APPARATUS AND SYSTEM FOR ENCODING AND DECODING A TREE OF BLOCKS OF VIDEO SAMPLES". This application claims the benefit under 35 U.S.C. § 119 of the filing date of Australian Patent Application No. 2018233042, filed Sep. 21, 2018, hereby incorporated by reference in its entirety as if fully set forth herein.

TECHNICAL FIELD

The present invention relates generally to digital video signal processing and, in particular, to a method, apparatus and system for encoding and decoding a tree of blocks of video samples. The present invention also relates to a computer program product including a computer readable medium having recorded thereon a computer program for encoding and decoding a tree of blocks of video samples.

BACKGROUND

Many applications for video coding currently exist, including applications for transmission and storage of video data. Many video coding standards have also been developed and others are currently in development. Recent developments in video coding standardisation have led to the formation of a group called the "Joint Video Experts Team" (JVET). The Joint Video Experts Team (JVET) includes members of Study Group 16, Question 6 (SG16/Q6) of the Telecommunication Standardisation Sector (ITU-T) of the International Telecommunication Union (ITU), also known as the "Video Coding Experts Group" (VCEG), and members of the International Organisations for Standardisation/International Electrotechnical Commission Joint Technical Committee 1/Subcommittee 29/Working Group 11 (ISO/IEC JTC1/SC29/WG11), also known as the "Moving Picture Experts Group" (MPEG).

The Joint Video Experts Team (JVET) issued a Call for Proposals (CfP), with responses analysed at its $10^{th}$ meeting in San Diego, USA. The submitted responses demonstrated video compression capability significantly outperforming that of the current state-of-the-art video compression standard, i.e.: "high efficiency video coding" (HEVC). On the basis of this outperformance it was decided to commence a project to develop a new video compression standard, to be named 'versatile video coding' (VVC). VVC is anticipated to address ongoing demand for ever-higher compression performance, especially as video formats increase in capability (e.g., with higher resolution and higher frame rate) and address increasing market demand for service delivery over WANs, where bandwidth costs are relatively high. At the same time, VVC must be implementable in contemporary silicon processes and offer an acceptable trade-off between the achieved performance versus the implementation cost (for example, in terms of silicon area, CPU processor load, memory utilisation and bandwidth).

Video data includes a sequence of frames of image data, each of which include one or more colour channels. Generally one primary colour channel and two secondary colour channels are needed. The primary colour channel is generally referred to as the 'luma' channel and the secondary colour channel(s) are generally referred to as the 'chroma' channels. Although video data is typically displayed in an RGB (red-green-blue) colour space, this colour space has a high degree of correlation between the three respective components. The video data representation seen by an encoder or a decoder is often using a colour space such as YCbCr. YCbCr concentrates luminance, mapped to 'luma' according to a transfer function, in a Y (primary) channel and chroma in Cb and Cr (secondary) channels. Moreover, the Cb and Cr channels may be sampled spatially at a lower rate compared to the luma channel, for example half horizontally and half vertically—known as a '4:2:0 chroma format'. The 4:2:0 chroma format is commonly used in 'consumer' applications, such as internet video streaming, broadcast television, and storage on Blu-Ray™ disks. Subsampling the Cb and Cr channels at half-rate horizontally and not subsampling vertically is known as a '4:2:2 chroma format'. The 4:2:2 chroma format is typically used in professional applications, including capture of footage for cinematic production and the like. The higher sampling rate of the 4:2:2 chroma format makes the resulting video more resilient to editing operations such as colour grading. Prior to distribution to consumers, 4:2:2 chroma format material is often converted to the 4:2:0 chroma format and then encoded prior to distribution to consumers. In addition to chroma format, video is also characterised by resolution and frame rate. Example resolutions are ultra-high definition (UHD) with a resolution of 3840×2160 or '8K' with a resolution of 7680×4320 and example frame rates are 60 or 120 Hz. Luma sample rates may range from approximately 500 mega samples per second to several giga samples per second. For the 4:2:0 chroma format, the sample rate of each chroma channel is one quarter the luma sample rate and for the 4:2:2 chroma format, the sample rate of each chroma channel is one half the luma sample rate.

The VVC standard is a 'block based' codec, in which frames are firstly divided into a square array of regions known as 'coding tree units' (CTUs). CTUs generally occupy a relatively large area, such as 128×128 luma samples. However, CTUs at the right and bottom edge of each frame may be smaller in area. Associated with each CTU is a 'coding tree' for the luma channel and an additional coding tree for the chroma channels. A coding tree defines a decomposition of the area of the CTU into a set of blocks, also referred to as 'coding blocks' (CBs). It is also possible for a single coding tree to specify blocks both for the luma channel and the chroma channels, in which case the blocks are referred to as 'coding units' (CUs), each CU having a coding block for each colour channel. The CBs are processed for encoding or decoding in a particular order. As a consequence of the use of the 4:2:0 chroma format, a CTU with a luma coding tree for a 128×128 luma sample area has a corresponding chroma coding tree for a 64×64 chroma sample area, collocated with the 128×128 luma sample area. When a single coding tree is in use for the luma channel and the chroma channels, the collections of collocated blocks for a given area are generally referred to as 'units', for example the above-mentioned CUs, as well as 'prediction units' (PUs), and 'transform units' (TUs). When separate coding trees are used for a given area, the above-mentioned CBs, as well as 'prediction blocks' (PBs), and 'transform blocks' (TBs) are used.

Notwithstanding the above distinction between 'units' and 'blocks', the term 'block' may be used as a general term for areas or regions of a frame for which operations are applied to all colour channels.

For each CU a prediction (PU) of the contents (sample values) of the corresponding area of frame data is generated (a 'prediction unit'). Further, a representation of the difference (or 'residual' in the spatial domain) between the prediction and the contents of the area as seen at input to the encoder is formed. The difference in each colour channel may be transformed coded as a sequence of residual coefficients, forming one or more TUs for a given CU. The applied transform may be a Discrete Cosine Transform (DCT) or other transform, applied to each block of residual values. This primary transform is applied separably, i.e. that is the two dimensional transform is performed in two passes. The block is firstly transformed by applying a one-dimensional transform to each row of samples in the block. Then, the partial result is transformed by applying a one-dimensional transform to each column of the partial result to produce a final block of transform coefficients that substantially decorrelates the residual samples. Transforms of various sizes are supported by the VVC standard, including transforms of rectangular-shaped blocks, with each side dimension being a power of two. Transform coefficients are quantised for entropy encoding into a bitstream.

When spatial prediction ('intra prediction') is used to generate PBs, a set of reference samples is used to generate predicted samples for the current PB. The reference samples include samples adjacent to the PB that have already been 'reconstructed' (the addition of residual samples to intra predicted samples). These adjacent samples form a row above the PB and a column to the left of the PB. The row and column also extend beyond the PB boundary to include additional nearby samples. Due to scanning blocks in a Z-order scan, some of the reference samples will have been reconstructed in the immediately preceding block. The use of samples from the immediately preceding block results in a feedback dependency that may limit the throughput of blocks through a video encoder or decoder.

SUMMARY

It is an object of the present invention to substantially overcome, or at least ameliorate, one or more disadvantages of existing arrangements.

One aspect of the present disclosure provides a method of decoding coding blocks of a coding tree unit in an image frame, from a bitstream, the method comprising: receiving the image frame, the image frame having a chroma format wherein chroma channels of the image frame are subsampled relative to a luma channel of the image frame; determining luma split options for the luma channel of the coding tree unit according to dimensions of a region of the coding tree unit; determining chroma split options for the chroma channels of the coding tree unit according to the dimensions of the region, the chroma split options being different to the luma split options, the allowable chroma split options resulting in chroma intra predicted blocks with a minimum size of 16 samples; and decoding the coding blocks of the coding tree unit by determining flags from the bitstream to select one of the determined luma split options and one of the determined chroma split options.

According to another aspect, the chroma block size is a multiple of 16 samples for chroma channels of the image frame.

According to another aspect, the determined luma split options result in a luma block size that is a multiple of 16 samples for a luma channel of the image frame.

According to another aspect, chroma blocks having a width of two samples are coded using a division of the block into sub-blocks, each sub-block of size 2 by 8 samples.

According to another aspect, chroma blocks having a height of two samples are coded using a division of the block into sub-blocks, each sub-block of size 8 by 2 samples.

Another aspect of the present disclosure provides a non-transitory computer-readable medium having a computer program stored thereon to implement a method of decoding coding blocks of a coding tree unit in an image frame, from a bitstream, the program comprising: code for receiving the image frame, the image frame having a chroma format wherein chroma channels of the image frame are subsampled relative to a luma channel of the image frame; code for determining luma split options for the luma channel of the coding tree unit according to dimensions of a region of the coding tree unit; code for determining chroma split options for the chroma channels of the coding tree unit according to the dimensions of the region, the chroma split options being different to the luma split options, the allowable chroma split options resulting in chroma intra predicted blocks with a minimum size of 16 samples; and code for decoding the coding blocks of the coding tree unit by determining flags from the bitstream to select one of the determined luma split options and one of the determined chroma split options.

Another aspect of the present disclosure provides a video decoder, configured to: receive a coding tree unit of an image frame from a bitstream, the image frame having a chroma format wherein chroma channels of the image frame are subsampled relative to a luma channel of the image frame; determine luma split options for the luma channel of the coding tree unit according to dimensions of a region of the coding tree unit; determine chroma split options for the chroma channels of the coding tree unit according to the dimensions of the region, the chroma split options being different to the luma split options, the allowable chroma split options resulting in chroma intra predicted blocks with a minimum size of 16 samples; and decode coding blocks of the coding tree unit by determining flags from the bitstream to select one of the determined luma split options and one of the determined chroma split options.

Another aspect of the present disclosure provides a system, comprising: a memory; and a processor, wherein the processor is configured to execute code stored on the memory for implementing a method of decoding coding blocks of a coding tree unit in an image frame, from a bitstream, the method comprising: receiving the image frame, the image frame having a chroma format wherein chroma channels of the image frame are subsampled relative to a luma channel of the image frame; determining luma split options for the luma channel of the coding tree unit according to dimensions of a region of the coding tree unit; determining chroma split options for the chroma channels of the coding tree unit according to the dimensions of the region, the chroma split options being different to the luma split options, the allowable chroma split options resulting in chroma blocks with a minimum size of 16 samples; and decoding the coding blocks of the coding tree unit by determining flags from the bitstream to select one of the determined luma split options and one of the determined allowable chroma split options.

Other aspects are also disclosed.

BRIEF DESCRIPTION OF THE DRAWINGS

At least one embodiment of the present invention will now be described with reference to the following drawings and appendices, in which.

DETAILED DESCRIPTION INCLUDING BEST MODE

Figure 1:
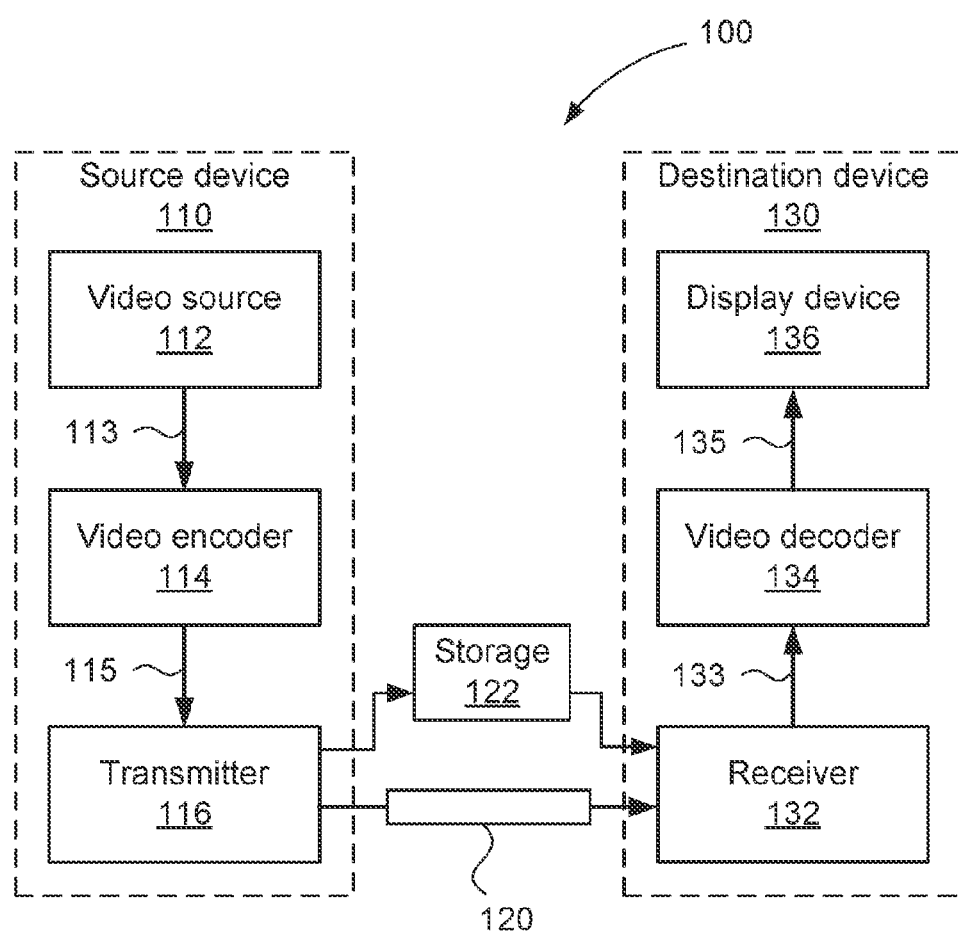
FIG. 1 is a schematic block diagram showing a video encoding and decoding system.

Where reference is made in any one or more of the accompanying drawings to steps and/or features, which have the same reference numerals, those steps and/or features have for the purposes of this description the same function(s) or operation(s), unless the contrary intention appears.

As described above, use of samples from the immediately preceding block results in a feedback dependency that may limit the throughput of blocks through a video encoder or decoder. Methods to alleviate the severity of the resultant feedback dependency loop are desirable to ensure a high rate of processing blocks can be sustained, as needed for typical real-time encoding and decoding applications. The feedback dependency loop is particularly problematic for the high sample rates of contemporary video formats, for example from 500-4000 samples per second, whereas ASIC (application-specific integrated circuits) clock frequencies are typically in the hundreds of MHz.

FIG. 1 is a schematic block diagram showing functional modules of a video encoding and decoding system 100. The system 100 may utilise different rules for allowed subdivisions of regions in the luma and chroma coding trees to reduce the worst case block processing rate encountered. For example, the system 100 may operate such that blocks are always sized as a multiple of 16 (sixteen) samples, regardless of the aspect ratio of the block. Residual coefficient coding may also exploit the multiple of 16 block size, including in the case of blocks having a width or height of two samples.

The system 100 includes a source device 110 and a destination device 130. A communication channel 120 is used to communicate encoded video information from the source device 110 to the destination device 130. In some arrangements, the source device 110 and destination device 130 may either or both comprise respective mobile telephone handsets or "smartphones", in which case the communication channel 120 is a wireless channel. In other arrangements, the source device 110 and destination device 130 may comprise video conferencing equipment, in which case the communication channel 120 is typically a wired channel, such as an internet connection. Moreover, the source device 110 and the destination device 130 may comprise any of a wide range of devices, including devices supporting over-the-air television broadcasts, cable television applications, internet video applications (including streaming) and applications where encoded video data is captured on some computer-readable storage medium, such as hard disk drives in a file server.

As shown in FIG. 1, the source device 110 includes a video source 112, a video encoder 114 and a transmitter 116. The video source 112 typically comprises a source of captured video frame data (shown as 113), such as an image capture sensor, a previously captured video sequence stored on a non-transitory recording medium, or a video feed from a remote image capture sensor. The video source 112 may also be an output of a computer graphics card, for example displaying the video output of an operating system and various applications executing upon a computing device, for example a tablet computer. Examples of source devices 110 that may include an image capture sensor as the video source 112 include smart-phones, video camcorders, professional video cameras, and network video cameras.

Figure 3:
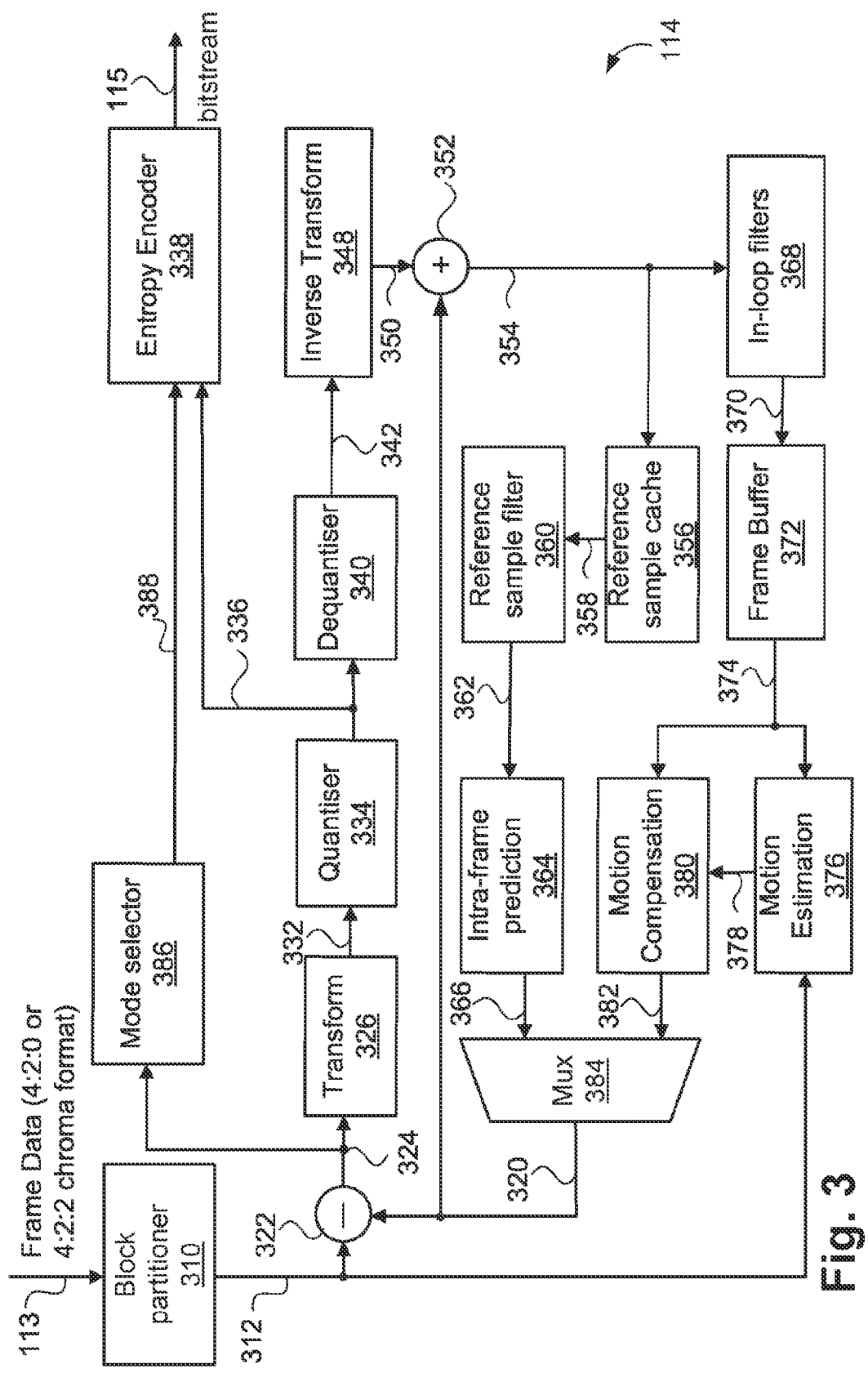
FIG. 3 is a schematic block diagram showing functional modules of a video encoder.

The video encoder 114 converts (or 'encodes') the captured frame data (indicated by an arrow 113) from the video source 112 into a bitstream (indicated by an arrow 115) as described further with reference to FIG. 3. The bitstream 115 is transmitted by the transmitter 116 over the communication channel 120 as encoded video data (or "encoded video information"). It is also possible for the bitstream 115 to be stored in a non-transitory storage device 122, such as a "Flash" memory or a hard disk drive, until later being transmitted over the communication channel 120, or in-lieu of transmission over the communication channel 120.

The destination device 130 includes a receiver 132, a video decoder 134 and a display device 136. The receiver 132 receives encoded video data from the communication channel 120 and passes received video data to the video decoder 134 as a bitstream (indicated by an arrow 133). The video decoder 134 then outputs decoded frame data (indicated by an arrow 135) to the display device 136. The decoded frame data 135 has the same chroma format as the frame data 113. Examples of the display device 136 include a cathode ray tube, a liquid crystal display, such as in smart-phones, tablet computers, computer monitors or in stand-alone television sets. It is also possible for the functionality of each of the source device 110 and the destination device 130 to be embodied in a single device, examples of which include mobile telephone handsets and tablet computers.

Figure 2A:
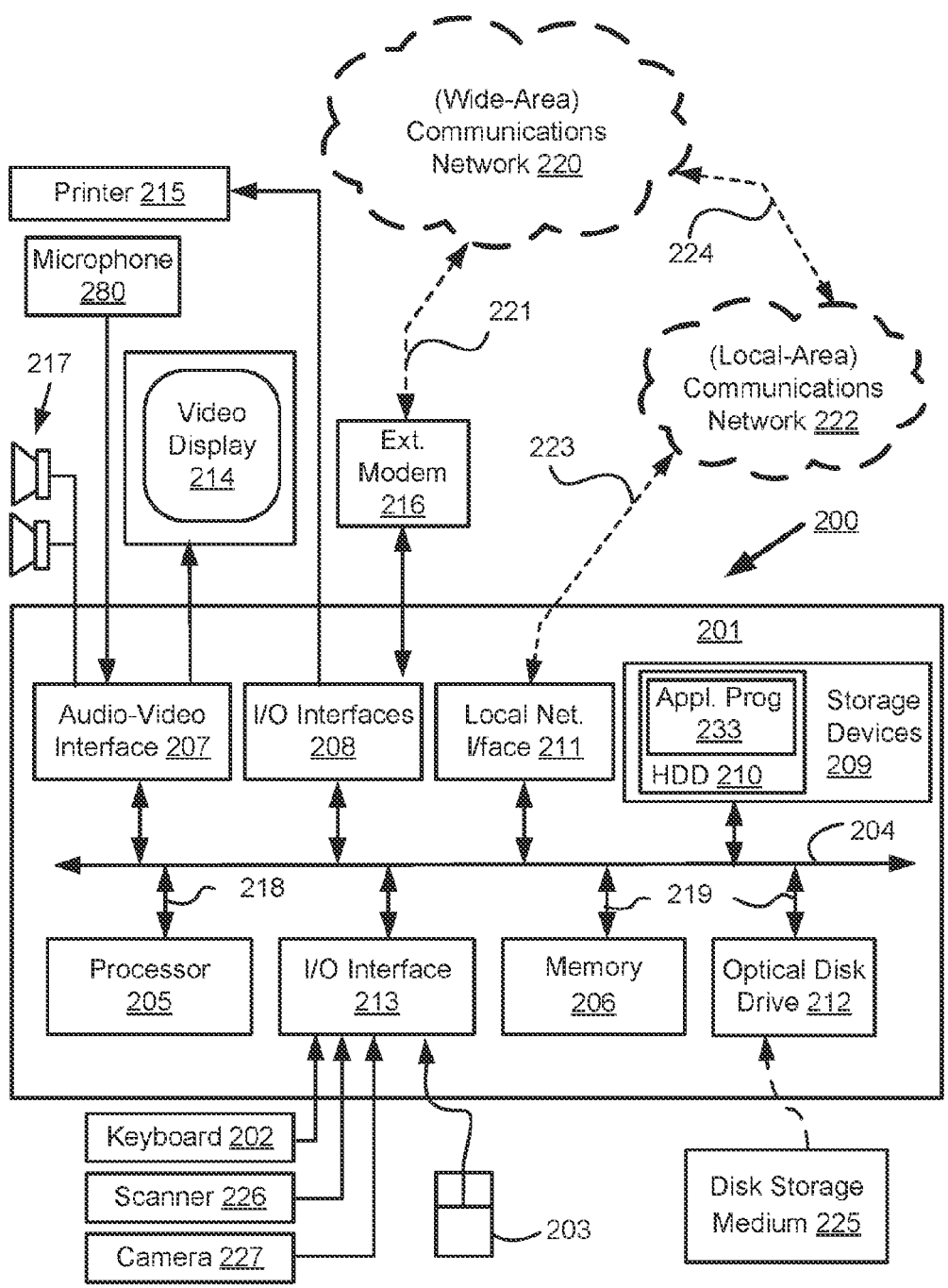
FIGS. 2A and 2B form a schematic block diagram of a general purpose computer system upon which one or both of the video encoding and decoding system of FIG. 1 may be practised.

Notwithstanding the example devices mentioned above, each of the source device 110 and destination device 130 may be configured within a general purpose computing system, typically through a combination of hardware and software components. FIG. 2A illustrates such a computer system 200, which includes: a computer module 201; input devices such as a keyboard 202, a mouse pointer device 203, a scanner 226, a camera 227, which may be configured as the video source 112, and a microphone 280; and output devices including a printer 215, a display device 214, which may be configured as the display device 136, and loudspeakers 217. An external Modulator-Demodulator (Modem) transceiver device 216 may be used by the computer module 201 for communicating to and from a communications network 220 via a connection 221. The communications network 220, which may represent the communication channel 120, may be a wide-area network (WAN), such as the Internet, a cellular telecommunications network, or a private WAN. Where the connection 221 is a telephone line, the modem 216 may be a traditional "dial-up" modem. Alternatively, where the connection 221 is a high capacity (e.g., cable or optical) connection, the modem 216 may be a broadband modem. A wireless modem may also be used for wireless connection to the communications network 220. The transceiver device 216 may provide the functionality of the transmitter 116 and the receiver 132 and the communication channel 120 may be embodied in the connection 221.

The computer module 201 typically includes at least one processor unit 205, and a memory unit 206. For example, the memory unit 206 may have semiconductor random access memory (RAM) and semiconductor read only memory (ROM). The computer module 201 also includes an number of input/output (I/O) interfaces including: an audio-video interface 207 that couples to the video display 214, loudspeakers 217 and microphone 280; an I/O interface 213 that couples to the keyboard 202, mouse 203, scanner 226, camera 227 and optionally a joystick or other human interface device (not illustrated); and an interface 208 for the external modem 216 and printer 215. The signal from the audio-video interface 207 to the computer monitor 214 is generally the output of a computer graphics card. In some implementations, the modem 216 may be incorporated within the computer module 201, for example within the interface 208. The computer module 201 also has a local network interface 211, which permits coupling of the computer system 200 via a connection 223 to a local-area communications network 222, known as a Local Area Network (LAN). As illustrated in FIG. 2A, the local communications network 222 may also couple to the wide network 220 via a connection 224, which would typically include a so-called "firewall" device or device of similar functionality. The local network interface 211 may comprise an Ethernet™ circuit card, a Bluetooth™ wireless arrangement or an IEEE 802.11 wireless arrangement; however, numerous other types of interfaces may be practiced for the interface 211. The local network interface 211 may also provide the functionality of the transmitter 116 and the receiver 132 and communication channel 120 may also be embodied in the local communications network 222.

The I/O interfaces 208 and 213 may afford either or both of serial and parallel connectivity, the former typically being implemented according to the Universal Serial Bus (USB) standards and having corresponding USB connectors (not illustrated). Storage devices 209 are provided and typically include a hard disk drive (HDD) 210. Other storage devices such as a floppy disk drive and a magnetic tape drive (not illustrated) may also be used. An optical disk drive 212 is typically provided to act as a non-volatile source of data. Portable memory devices, such optical disks (e.g. CD-ROM, DVD, Blu ray Disc™), USB-RAM, portable, external hard drives, and floppy disks, for example, may be used as appropriate sources of data to the computer system 200. Typically, any of the HDD 210, optical drive 212, networks 220 and 222 may also be configured to operate as the video source 112, or as a destination for decoded video data to be stored for reproduction via the display 214. The source device 110 and the destination device 130 of the system 100 may be embodied in the computer system 200.

The components 205 to 213 of the computer module 201 typically communicate via an interconnected bus 204 and in a manner that results in a conventional mode of operation of the computer system 200 known to those in the relevant art. For example, the processor 205 is coupled to the system bus 204 using a connection 218. Likewise, the memory 206 and optical disk drive 212 are coupled to the system bus 204 by connections 219. Examples of computers on which the described arrangements can be practised include IBM-PC's and compatibles, Sun SPARCstations, Apple Mac™ or alike computer systems.

Where appropriate or desired, the video encoder 114 and the video decoder 134, as well as methods described below, may be implemented using the computer system 200. In particular, the video encoder 114, the video decoder 134 and methods to be described, may be implemented as one or more software application programs 233 executable within the computer system 200. In particular, the video encoder 114, the video decoder 134 and the steps of the described methods are effected by instructions 231 (see FIG. 2B) in the software 233 that are carried out within the computer system 200. The software instructions 231 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software is loaded into the computer system 200 from the computer readable medium, and then executed by the computer system 200. A computer readable medium having such software or computer program recorded on the computer readable medium is a computer program product. The use of the computer program product in the computer system 200 preferably effects an advantageous apparatus for implementing the video encoder 114, the video decoder 134 and the described methods.

The software 233 is typically stored in the HDD 210 or the memory 206. The software is loaded into the computer system 200 from a computer readable medium, and executed by the computer system 200. Thus, for example, the software 233 may be stored on an optically readable disk storage medium (e.g., CD-ROM) 225 that is read by the optical disk drive 212.

In some instances, the application programs 233 may be supplied to the user encoded on one or more CD-ROMs 225 and read via the corresponding drive 212, or alternatively may be read by the user from the networks 220 or 222. Still further, the software can also be loaded into the computer system 200 from other computer readable media. Computer readable storage media refers to any non-transitory tangible storage medium that provides recorded instructions and/or data to the computer system 200 for execution and/or processing. Examples of such storage media include floppy disks, magnetic tape, CD-ROM, DVD, Blu-ray Disc™, a hard disk drive, a ROM or integrated circuit, USB memory, a magneto-optical disk, or a computer readable card such as a PCMCIA card and the like, whether or not such devices are internal or external of the computer module 201. Examples of transitory or non-tangible computer readable transmission media that may also participate in the provision of the software, application programs, instructions and/or video data or encoded video data to the computer module 401 include radio or infra-red transmission channels, as well as a network connection to another computer or networked device, and the Internet or Intranets including e-mail transmissions and information recorded on Websites and the like.

The second part of the application program 233 and the corresponding code modules mentioned above may be executed to implement one or more graphical user interfaces (GUIs) to be rendered or otherwise represented upon the display 214. Through manipulation of typically the keyboard 202 and the mouse 203, a user of the computer system 200 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 217 and user voice commands input via the microphone 280.

Figure 2B:
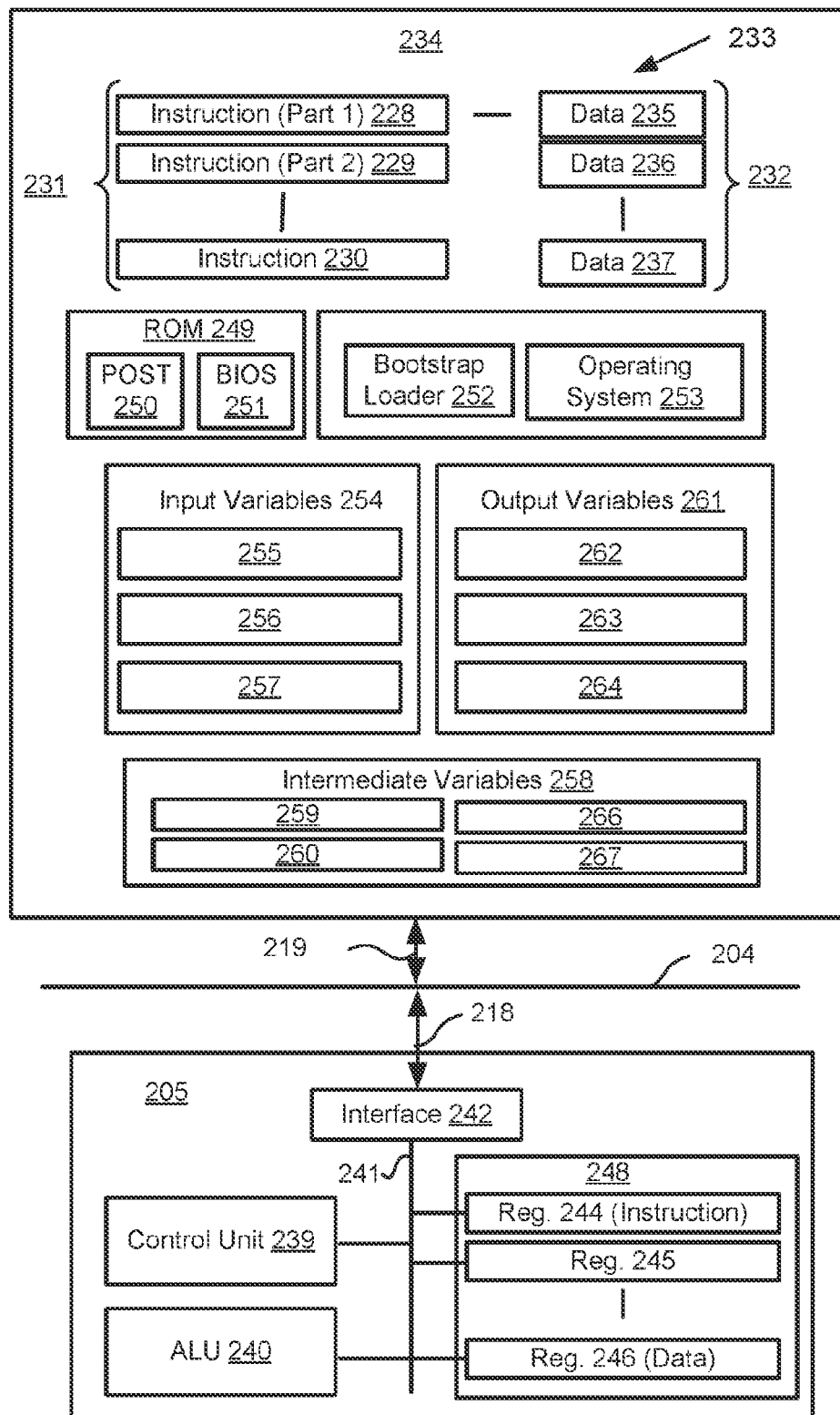

FIG. 2B is a detailed schematic block diagram of the processor 205 and a "memory" 234. The memory 234 represents a logical aggregation of all the memory modules (including the HDD 209 and semiconductor memory 206) that can be accessed by the computer module 201 in FIG. 2A.

When the computer module 201 is initially powered up, a power-on self-test (POST) program 250 executes. The POST program 250 is typically stored in a ROM 249 of the semiconductor memory 206 of FIG. 2A. A hardware device such as the ROM 249 storing software is sometimes referred to as firmware. The POST program 250 examines hardware within the computer module 201 to ensure proper functioning and typically checks the processor 205, the memory 234 (209, 206), and a basic input-output systems software (BIOS) module 251, also typically stored in the ROM 249, for correct operation. Once the POST program 250 has run successfully, the BIOS 251 activates the hard disk drive 210 of FIG. 2A. Activation of the hard disk drive 210 causes a bootstrap loader program 252 that is resident on the hard disk drive 210 to execute via the processor 205. This loads an operating system 253 into the RAM memory 206, upon which the operating system 253 commences operation. The operating system 253 is a system level application, executable by the processor 205, to fulfil various high level functions, including processor management, memory management, device management, storage management, software application interface, and generic user interface.

The operating system 253 manages the memory 234 (209, 206) to ensure that each process or application running on the computer module 201 has sufficient memory in which to execute without colliding with memory allocated to another process. Furthermore, the different types of memory available in the computer system 200 of FIG. 2A must be used properly so that each process can run effectively. Accordingly, the aggregated memory 234 is not intended to illustrate how particular segments of memory are allocated (unless otherwise stated), but rather to provide a general view of the memory accessible by the computer system 200 and how such is used.

As shown in FIG. 2B, the processor 205 includes a number of functional modules including a control unit 239, an arithmetic logic unit (ALU) 240, and a local or internal memory 248, sometimes called a cache memory. The cache memory 248 typically includes a number of storage registers 244-246 in a register section. One or more internal busses 241 functionally interconnect these functional modules. The processor 205 typically also has one or more interfaces 242 for communicating with external devices via the system bus 204, using a connection 218. The memory 234 is coupled to the bus 204 using a connection 219.

The application program 233 includes a sequence of instructions 231 that may include conditional branch and loop instructions. The program 233 may also include data 232 which is used in execution of the program 233. The instructions 231 and the data 232 are stored in memory locations 228, 229, 230 and 235, 236, 237, respectively. Depending upon the relative size of the instructions 231 and the memory locations 228-230, a particular instruction may be stored in a single memory location as depicted by the instruction shown in the memory location 230. Alternately, an instruction may be segmented into a number of parts each of which is stored in a separate memory location, as depicted by the instruction segments shown in the memory locations 228 and 229.

In general, the processor 205 is given a set of instructions which are executed therein. The processor 205 waits for a subsequent input, to which the processor 205 reacts to by executing another set of instructions. Each input may be provided from one or more of a number of sources, including data generated by one or more of the input devices 202, 203, data received from an external source across one of the networks 220, 202, data retrieved from one of the storage devices 206, 209 or data retrieved from a storage medium 225 inserted into the corresponding reader 212, all depicted in FIG. 2A. The execution of a set of the instructions may in some cases result in output of data. Execution may also involve storing data or variables to the memory 234.

The video encoder 114, the video decoder 134 and the described methods may use input variables 254, which are stored in the memory 234 in corresponding memory locations 255, 256, 257. The video encoder 114, the video decoder 134 and the described methods produce output variables 261, which are stored in the memory 234 in corresponding memory locations 262, 263, 264. Intermediate variables 258 may be stored in memory locations 259, 260, 266 and 267.

Referring to the processor 205 of FIG. 2B, the registers 244, 245, 246, the arithmetic logic unit (ALU) 240, and the control unit 239 work together to perform sequences of micro-operations needed to perform "fetch, decode, and execute" cycles for every instruction in the instruction set making up the program 233. Each fetch, decode, and execute cycle comprises:

a fetch operation, which fetches or reads an instruction 231 from a memory location 228, 229, 230;

a decode operation in which the control unit 239 determines which instruction has been fetched; and an execute operation in which the control unit 239 and/or the ALU 240 execute the instruction.

Thereafter, a further fetch, decode, and execute cycle for the next instruction may be executed. Similarly, a store cycle may be performed by which the control unit 239 stores or writes a value to a memory location 232.

Each step or sub-process in the method of FIGS. 10 to 13, to be described, is associated with one or more segments of the program 233 and is typically performed by the register section 244, 245, 247, the ALU 240, and the control unit 239 in the processor 205 working together to perform the fetch, decode, and execute cycles for every instruction in the instruction set for the noted segments of the program 233.

Figure 4:
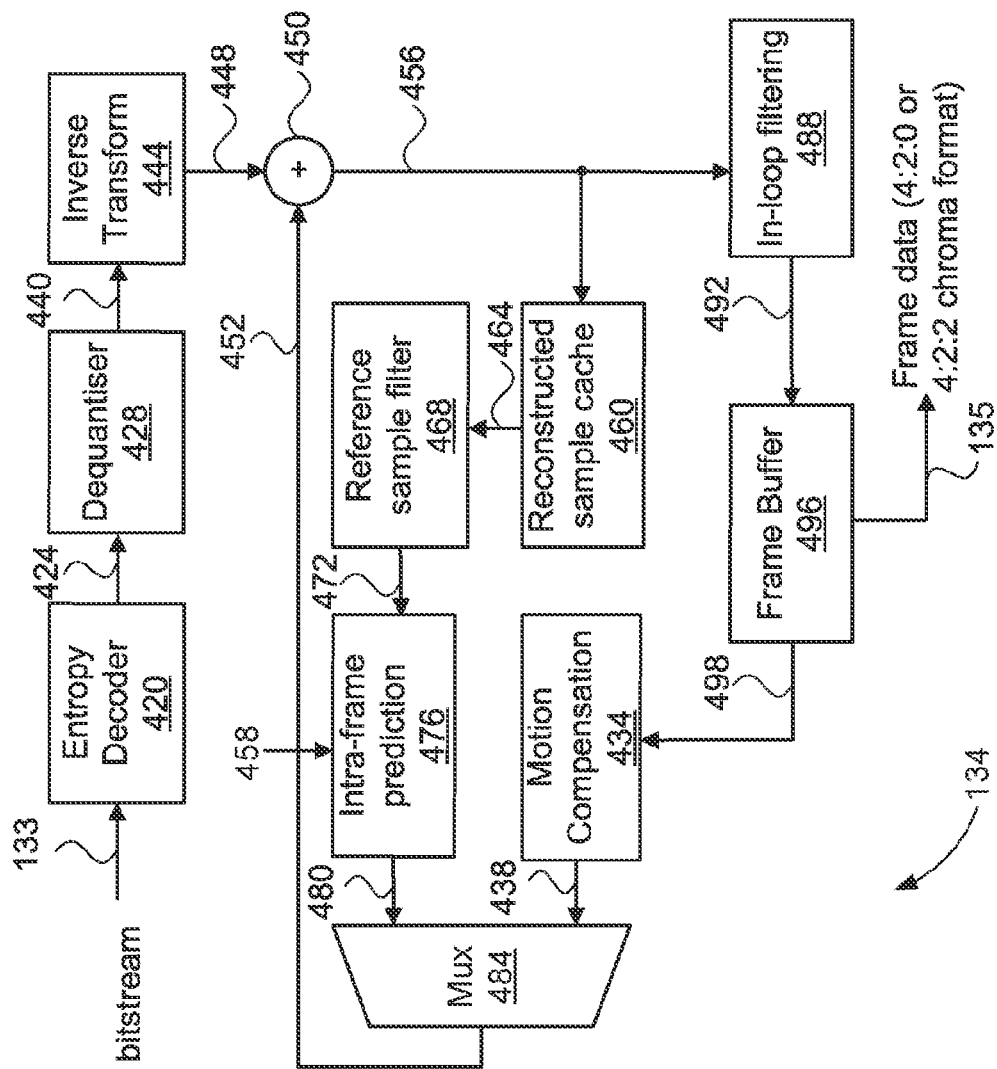
FIG. 4 is a schematic block diagram showing functional modules of a video decoder.

FIG. 3 is a schematic block diagram showing functional modules of the video encoder 114. FIG. 4 is a schematic block diagram showing functional modules of the video decoder 134. Generally, data passes between functional modules within the video encoder 114 and the video decoder 134 in groups of samples or coefficients, such as divisions of blocks into sub-blocks of a fixed size, or as arrays. The video encoder 114 and video decoder 134 may be implemented using a general-purpose computer system 200, as shown in FIGS. 2A and 2B, where the various functional modules may be implemented by dedicated hardware within the computer system 200, by software executable within the computer system 200 such as one or more software code modules of the software application program 233 resident on the hard disk drive 205 and being controlled in its execution by the processor 205. Alternatively the video encoder 114 and video decoder 134 may be implemented by a combination of dedicated hardware and software executable within the computer system 200. The video encoder 114, the video decoder 134 and the described methods may alternatively be implemented in dedicated hardware, such as one or more integrated circuits performing the functions or sub functions of the described methods. Such dedicated hardware may include graphic processing units (GPUs), digital signal processors (DSPs), application-specific standard products (ASSPs), application-specific integrated circuits (ASICs), field programmable gate arrays (FPGAs) or one or more microprocessors and associated memories. In particular, the video encoder 114 comprises modules 310-386 and the video decoder 134 comprises modules 420-496 which may each be implemented as one or more software code modules of the software application program 233.

Although the video encoder 114 of FIG. 3 is an example of a versatile video coding (VVC) video encoding pipeline, other video codecs may also be used to perform the processing stages described herein. The video encoder 114 receives captured frame data 113, such as a series of frames, each frame including one or more colour channels. The frame data 113 may be in a 4:2:0 chroma format or a 4:2:2 chroma format. A block partitioner 310 firstly divides the frame data 113 into CTUs, generally square in shape and configured such that a particular size for the CTUs is used. The size of the CTUs may be 64×64, 128×128, or 256×256 luma samples for example. The block partitioner 310 further divides each CTU into one or more CBs according to a luma coding tree and a chroma coding tree. The CBs have a variety of sizes, and may include both square and non-square aspect ratios. Operation of the block partitioner 310 is further described with reference to FIG. 10. However, in the VVC standard, CBs, CUs, PUs, and TUs always have side lengths that are powers of two. Thus, a current CB, represented as 312, is output from the block partitioner 310, progressing in accordance with an iteration over the one or more blocks of the CTU, in accordance with the luma coding tree and the chroma coding tree of the CTU. Options for partitioning CTUs into CBs are further described below with reference to FIGS. 5 and 6.

The CTUs resulting from the first division of the frame data 113 may be scanned in raster scan order and may be grouped into one or more 'slices'. A slice may be an 'intra' (or 'I') slice An intra slice (I slice) indicates that every CU in the slice is intra predicted. Alternatively, a slice may be uni- or bi-predicted ('P' or 'B' slice, respectively), indicating additional availability of uni- and bi-prediction in the slice, respectively.

For each CTU, the video encoder 114 operates in two stages. In the first stage (referred to as a 'search' stage), the block partitioner 310 tests various potential configurations of a coding tree. Each potential configuration of a coding tree has associated 'candidate' CBs. The first stage involves testing various candidate CBs to select CBs providing high compression efficiency with low distortion. The testing generally involves a Lagrangian optimisation whereby a candidate CB is evaluated based on a weighted combination of the rate (coding cost) and the distortion (error with respect to the input frame data 113). The 'best' candidate CBs (the CBs with the lowest evaluated rate/distortion) are selected for subsequent encoding into the bitstream 115. Included in evaluation of candidate CBs is an option to use a CB for a given area or to further split the area according to various splitting options and code each of the smaller resulting areas with further CBs, or split the areas even further. As a consequence, both the CBs and the coding tree themselves are selected in the search stage.

The video encoder 114 produces a prediction block (PB), indicated by an arrow 320, for each CB, for example the CB 312. The PB 320 is a prediction of the contents of the associated CB 312. A subtracter module 322 produces a difference, indicated as 324 (or 'residual', referring to the difference being in the spatial domain), between the PB 320 and the CB 312. The difference 324 is a block-size difference between corresponding samples in the PB 320 and the CB 312. The difference 324 is transformed, quantised and represented as a transform block (TB), indicated by an arrow 336. The PB 320 and associated TB 336 are typically chosen from one of many possible candidate CBs, for example based on evaluated cost or distortion.

A candidate coding block (CB) is a CB resulting from one of the prediction modes available to the video encoder 114 for the associated PB and the resulting residual. Each candidate CB results in one or more corresponding TBs, as described hereafter with reference to FIG. 8. The TB 336 is a quantised and transformed representation of the difference 324. When combined with the predicted PB in the video decoder 114, the TB 336 reduces the difference between decoded CBs and the original CB 312 at the expense of additional signalling in a bitstream.

Each candidate coding block (CB), that is prediction block (PB) in combination with a transform block (TB), thus has an associated coding cost (or 'rate') and an associated difference (or 'distortion'). The rate is typically measured in bits. The distortion of the CB is typically estimated as a difference in sample values, such as a sum of absolute differences (SAD) or a sum of squared differences (SSD). The estimate resulting from each candidate PB is determined by a mode selector 386 using the difference 324 to determine an intra prediction mode (represented by an arrow 388). Estimation of the coding costs associated with each candidate prediction mode and corresponding residual coding can be performed at significantly lower cost than entropy coding of the residual. Accordingly, a number of candidate modes can be evaluated to determine an optimum mode in a rate-distortion sense.

Determining an optimum mode in terms of rate-distortion is typically achieved using a variation of Lagrangian optimisation. Selection of the intra prediction mode 388 typically involves determining a coding cost for the residual data resulting from application of a particular intra prediction mode. The coding cost may be approximated by using a 'sum of absolute transformed differences' (SATD) whereby a relatively simple transform, such as a Hadamard transform, is used to obtain an estimated transformed residual cost. In some implementations using relatively simple transforms, the costs resulting from the simplified estimation method are monotonically related to the actual costs that would otherwise be determined from a full evaluation. In implementations with monotonically related estimated costs, the simplified estimation method may be used to make the same decision (i.e. intra prediction mode) with a reduction in complexity in the video encoder 114. To allow for possible non-monotonicity in the relationship between estimated and actual costs, the simplified estimation method may be used to generate a list of best candidates. The non-monotonicity may result from further mode decisions available for the coding of residual data, for example. The list of best candidates may be of an arbitrary number. A more complete search may be performed using the best candidates to establish optimal mode choices for coding the residual data for each of the candidates, allowing a final selection of the intra prediction mode along with other mode decisions.

The other mode decisions include an ability to skip a forward transform, known as 'transform skip'. Skipping the transforms is suited to residual data that lacks adequate correlation for reduced coding cost via expression as transform basis functions. Certain types of content, such as relatively simple computer generated graphics may exhibit similar behaviour. For a 'skipped transform', residual coefficients are still coded even though the transform itself is not performed.

Lagrangian or similar optimisation processing can be employed to both select an optimal partitioning of a CTU into CBs (by the block partitioner 310) as well as the selection of a best prediction mode from a plurality of possibilities. Through application of a Lagrangian optimisation process of the candidate modes in the mode selector module 386, the intra prediction mode with the lowest cost measurement is selected as the 'best' mode. The 'best' mode is the selected intra prediction mode 388 and is also encoded in the bitstream 115 by an entropy encoder 338. The selection of the intra prediction mode 388 by operation of the mode selector module 386 extends to operation of the block partitioner 310. For example, candidates for selection of the intra prediction mode 388 may include modes applicable to a given block and additionally modes applicable to multiple smaller blocks that collectively are collocated with the given block. In cases including modes applicable to a given block and smaller collocated blocks, the process of selection of candidates implicitly is also a process of determining the best hierarchical decomposition of the CTU into CBs.

In the second stage of operation of the video encoder 114 (referred to as a 'coding' stage), an iteration over the selected luma coding tree and the selected chroma coding tree, and hence each selected CB, is performed in the video encoder 114. In the iteration, the CBs are encoded into the bitstream 115, as described further herein.

The entropy encoder 338 supports both variable-length coding of syntax elements and arithmetic coding of syntax elements. Arithmetic coding is supported using a context-adaptive binary arithmetic coding process. Arithmetically coded syntax elements consist of sequences of one or more 'bins'. Bins, like bits, have a value of '0' or '1'. However bins are not encoded in the bitstream 115 as discrete bits. Bins have an associated predicted (or 'likely' or 'most probable') value and an associated probability, known as a 'context'. When the actual bin to be coded matches the predicted value, a 'most probable symbol' (MPS) is coded. Coding a most probable symbol is relatively inexpensive in terms of consumed bits. When the actual bin to be coded mismatches the likely value, a 'least probable symbol' (LPS) is coded. Coding a least probable symbol has a relatively high cost in terms of consumed bits. The bin coding techniques enable efficient coding of bins where the probability of a '0' versus a '1' is skewed. For a syntax element with two possible values (that is, a 'flag'), a single bin is adequate. For syntax elements with many possible values, a sequence of bins is needed.

The presence of later bins in the sequence may be determined based on the value of earlier bins in the sequence. Additionally, each bin may be associated with more than one context. The selection of a particular context can be dependent on earlier bins in the syntax element, the bin values of neighbouring syntax elements (i.e. those from neighbouring blocks) and the like. Each time a context-coded bin is encoded, the context that was selected for that bin (if any) is updated in a manner reflective of the new bin value. As such, the binary arithmetic coding scheme is said to be adaptive.

Also supported by the video encoder 114 are bins that lack a context ('bypass bins'). Bypass bins are coded assuming an equiprobable distribution between a '0' and a '1'. Thus, each bin occupies one bit in the bitstream 115. The absence of a context saves memory and reduces complexity, and thus bypass bins are used where the distribution of values for the particular bin is not skewed. One example of an entropy coder employing context and adaption is known in the art as CABAC (context adaptive binary arithmetic coder) and many variants of this coder have been employed in video coding.

The entropy encoder 338 encodes the intra prediction mode 388 using a combination of context-coded and bypass-coded bins. Typically, a list of 'most probable modes' is generated in the video encoder 114. The list of most probable modes is typically of a fixed length, such as three or six modes, and may include modes encountered in earlier blocks. A context-coded bin encodes a flag indicating if the intra prediction mode is one of the most probable modes. If the intra prediction mode 388 is one of the most probable modes, further signalling, using bypass-coded bins, is encoded. The encoded further signalling is indicative of which most probable mode corresponds with the intra prediction mode 388, for example using a truncated unary bin string. Otherwise, the intra prediction mode 388 is encoded as a 'remaining mode'. Encoding as a remaining mode uses an alternative syntax, such as a fixed-length code, also coded using bypass-coded bins, to express intra prediction modes other than those present in the most probable mode list.

A multiplexer module 384 outputs the PB 320 according to the determined best intra prediction mode 388, selecting from the tested prediction mode of each candidate CB. The candidate prediction modes need not include every conceivable prediction mode supported by the video encoder 114.

Prediction modes fall broadly into two categories. A first category is 'intra-frame prediction' (also referred to as 'intra prediction'). In intra-frame prediction, a prediction for a block is generated, and the generation method may use other samples obtained from the current frame. For an intra-predicted PB, it is possible for different intra-prediction modes to be used for luma and chroma, and thus intra prediction is described primarily in terms of operation upon PBs.

The second category of prediction modes is 'inter-frame prediction' (also referred to as 'inter prediction'). In inter-frame prediction a prediction for a block is produced using samples from one or two frames preceding the current frame in an order of coding frames in the bitstream. Moreover, for inter-frame prediction, a single coding tree is typically used for both the luma channel and the chroma channels. The order of coding frames in the bitstream may differ from the order of the frames when captured or displayed. When one frame is used for prediction, the block is said to be 'uni-predicted' and has one associated motion vector. When two frames are used for prediction, the block is said to be 'bi-predicted' and has two associated motion vectors. For a P slice, each CU may be intra predicted or uni-predicted. For a B slice, each CU may be intra predicted, uni-predicted, or bi-predicted. Frames are typically coded using a 'group of picture' structure, enabling a temporal hierarchy of frames. A temporal hierarchy of frames allows a frame to reference a preceding and a subsequent picture in the order of displaying the frames. The images are coded in the order necessary to ensure the dependencies for decoding each frame are met.

A subcategory of inter prediction is referred to as 'skip mode'. Inter prediction and skip modes are described as two distinct modes. However, both inter prediction mode and skip mode involve motion vectors referencing blocks of samples from preceding frames. Inter prediction involves a coded motion vector delta, specifying a motion vector relative to a motion vector predictor. The motion vector predictor is obtained from a list of one or more candidate motion vectors, selected with a 'merge index'. The coded motion vector delta provides a spatial offset to a selected motion vector prediction. Inter prediction also uses a coded residual in the bitstream 133. Skip mode uses only an index (also named a 'merge index') to select one out of several motion vector candidates. The selected candidate is used without any further signalling. Also, skip mode does not support coding of any residual coefficients. The absence of coded residual coefficients when the skip mode is used means that there is no need to perform transforms for the skip mode. Therefore, skip mode does not typically result in pipeline processing issues. Pipeline processing issues may be the case for intra predicted CUs and inter predicted CUs. Due to the limited signalling of the skip mode, skip mode is useful for achieving very high compression performance when relatively high quality reference frames are available. Bi-predicted CUs in higher temporal layers of a random-access group-of-picture structure typically have high quality reference pictures and motion vector candidates that accurately reflect underlying motion.

The samples are selected according to a motion vector and reference picture index. The motion vector and reference picture index applies to all colour channels and thus inter prediction is described primarily in terms of operation upon PUs rather than PBs. Within each category (that is, intra- and inter-frame prediction), different techniques may be applied to generate the PU. For example, intra prediction may use values from adjacent rows and columns of previously reconstructed samples, in combination with a direction to generate a PU according to a prescribed filtering and generation process. Alternatively, the PU may be described using a small number of parameters. Inter prediction methods may vary in the number of motion parameters and their precision. Motion parameters typically comprise a reference frame index, indicating which reference frame(s) from lists of reference frames are to be used plus a spatial translation for each of the reference frames, but may include more frames, special frames, or complex affine parameters such as scaling and rotation. In addition, a pre-determined motion refinement process may be applied to generate dense motion estimates based on referenced sample blocks.

Having determined and selected a 'best' PB 320, and subtracted the PB 320 from the original sample block at the subtractor 322, a residual with lowest coding cost, represented as 324, is obtained and subjected to lossy compression. The lossy compression process comprises the steps of transformation, quantisation and entropy coding. A transform module 326 applies a forward transform to the difference 324, converting the difference 324 to the frequency domain, and producing transform coefficients represented by an arrow 332. The forward transform is typically separable, transforming a set of rows and then a set of columns of each block. The transformation of each set of rows and columns is performed by applying one-dimensional transforms firstly to each row of a block to produce a partial result and then to each column of the partial result to produce a final result.

The transform coefficients 332 are passed to a quantiser module 334. At the module 334, quantisation in accordance with a 'quantisation parameter' is performed to produce residual coefficients, represented by the arrow 336. The quantisation parameter is constant for a given TB and thus results in a uniform scaling for the production of residual coefficients for a TB. A non-uniform scaling is also possible by application of a 'quantisation matrix', whereby the scaling factor applied for each residual coefficient is derived from a combination of the quantisation parameter and the corresponding entry in a scaling matrix, typically having a size equal to that of the TB. The residual coefficients 336 are supplied to the entropy encoder 338 for encoding in the bitstream 115. Typically, the residual coefficients of each TB with at least one significant residual coefficient of the TU are scanned to produce an ordered list of values, according to a scan pattern. The scan pattern generally scans the TB as a sequence of 4×4 'sub-blocks', providing a regular scanning operation at the granularity of 4×4 sets of residual coefficients, with the arrangement of sub-blocks dependent on the size of the TB. Additionally, the prediction mode 388 and the corresponding block partitioning are also encoded in the bitstream 115.

As described above, the video encoder 114 needs access to a frame representation corresponding to the frame representation seen in the video decoder 134. Thus, the residual coefficients 336 are also inverse quantised by a dequantiser module 340 to produce inverse transform coefficients, represented by an arrow 342. The inverse transform coefficients 342 are passed through an inverse transform module 348 to produce residual samples, represented by an arrow 350, of the TU. A summation module 352 adds the residual samples 350 and the PU 320 to produce reconstructed samples (indicated by an arrow 354) of the CU.

The reconstructed samples 354 are passed to a reference sample cache 356 and an in-loop filters module 368. The reference sample cache 356, typically implemented using static RAM on an ASIC (thus avoiding costly off-chip memory access) provides minimal sample storage needed to satisfy the dependencies for generating intra-frame PBs for subsequent CUs in the frame. The minimal dependencies typically include a 'line buffer' of samples along the bottom of a row of CTUs, for use by the next row of CTUs and column buffering the extent of which is set by the height of the CTU. The reference sample cache 356 supplies reference samples (represented by an arrow 358) to a reference sample filter 360. The sample filter 360 applies a smoothing operation to produce filtered reference samples (indicated by an arrow 362). The filtered reference samples 362 are used by an intra-frame prediction module 364 to produce an intra-predicted block of samples, represented by an arrow 366. For each candidate intra prediction mode the intra-frame prediction module 364 produces a block of samples, that is 366.

The in-loop filters module 368 applies several filtering stages to the reconstructed samples 354. The filtering stages include a 'deblocking filter' (DBF) which applies smoothing aligned to the CU boundaries to reduce artefacts resulting from discontinuities. Another filtering stage present in the in-loop filters module 368 is an 'adaptive loop filter' (ALF), which applies a Wiener-based adaptive filter to further reduce distortion. A further available filtering stage in the in-loop filters module 368 is a 'sample adaptive offset' (SAO) filter. The SAO filter operates by firstly classifying reconstructed samples into one or multiple categories and, according to the allocated category, applying an offset at the sample level.

Filtered samples, represented by an arrow 370, are output from the in-loop filters module 368. The filtered samples 370 are stored in a frame buffer 372. The frame buffer 372 typically has the capacity to store several (for example up to 16) pictures and thus is stored in the memory 206. The frame buffer 372 is not typically stored using on-chip memory due to the large memory consumption required. As such, access to the frame buffer 372 is costly in terms of memory bandwidth. The frame buffer 372 provides reference frames (represented by an arrow 374) to a motion estimation module 376 and a motion compensation module 380.

The motion estimation module 376 estimates a number of 'motion vectors' (indicated as 378), each being a Cartesian spatial offset from the location of the present CB, referencing a block in one of the reference frames in the frame buffer 372. A filtered block of reference samples (represented as 382) is produced for each motion vector. The filtered reference samples 382 form further candidate modes available for potential selection by the mode selector 386. Moreover, for a given CU, the PU 320 may be formed using one reference block ('uni-predicted') or may be formed using two reference blocks ('bi-predicted'). For the selected motion vector, the motion compensation module 380 produces the PB 320 in accordance with a filtering process supportive of sub-pixel accuracy in the motion vectors. As such, the motion estimation module 376 (which operates on many candidate motion vectors) may perform a simplified filtering process compared to that of the motion compensation module 380 (which operates on the selected candidate only) to achieve reduced computational complexity.

Although the video encoder 114 of FIG. 3 is described with reference to versatile video coding (VVC), other video coding standards or implementations may also employ the processing stages of modules 310-386. The frame data 113 (and bitstream 115) may also be read from (or written to) memory 206, the hard disk drive 210, a CD-ROM, a Blu-Ray Disk™ or other computer readable storage medium. Additionally, the frame data 113 (and bitstream 115) may be received from (or transmitted to) an external source, such as a server connected to the communications network 220 or a radio-frequency receiver.

The video decoder 134 is shown in FIG. 4. Although the video decoder 134 of FIG. 4 is an example of a versatile video coding (VVC) video decoding pipeline, other video codecs may also be used to perform the processing stages described herein. As shown in FIG. 4, the bitstream 133 is input to the video decoder 134. The bitstream 133 may be read from memory 206, the hard disk drive 210, a CD-ROM, a Blu-Ray Disk™ or other non-transitory computer readable storage medium. Alternatively, the bitstream 133 may be received from an external source such as a server connected to the communications network 220 or a radio-frequency receiver. The bitstream 133 contains encoded syntax elements representing the captured frame data to be decoded.

The bitstream 133 is input to an entropy decoder module 420. The entropy decoder module 420 extracts syntax elements from the bitstream 133 and passes the values of the syntax elements to other modules in the video decoder 134.

The entropy decoder module 420 applies a CABAC algorithm to decode syntax elements from the bitstream 133. The decoded syntax elements are used to reconstruct parameters within the video decoder 134. Parameters include residual coefficients (represented by an arrow 424) and mode selection information such as an intra prediction mode (represented by an arrow 458). The mode selection information also includes information such as motion vectors, and the partitioning of each CTU into one or more CBs. Parameters are used to generate PBs, typically in combination with sample data from previously decoded CBs.

The residual coefficients 424 are input to a dequantiser module 428. The dequantiser module 428 performs inverse quantisation (or 'scaling') on the residual coefficients 424 to create reconstructed transform coefficients, represented by an arrow 440, according to a quantisation parameter. Should use of a non-uniform inverse quantisation matrix be indicated in the bitstream 133, the video decoder 134 reads a quantisation matrix from the bitstream 133 as a sequence of scaling factors and arranges the scaling factors into a matrix. The inverse scaling uses the quantisation matrix in combination with the quantisation parameter to create the reconstructed transform coefficients 440.

The reconstructed transform coefficients 440 are passed to an inverse transform module 444. The module 444 transforms the coefficients from the frequency domain back to the spatial domain. The TB is effectively based on significant residual coefficients and non-significant residual coefficient values. The result of operation of the module 444 is a block of residual samples, represented by an arrow 448. The residual samples 448 are equal in size to the corresponding CU. The residual samples 448 are supplied to a summation module 450. At the summation module 450 the residual samples 448 are added to a decoded PB (represented as 452) to produce a block of reconstructed samples, represented by an arrow 456. The reconstructed samples 456 are supplied to a reconstructed sample cache 460 and an in-loop filtering module 488. The in-loop filtering module 488 produces reconstructed blocks of frame samples, represented as 492. The frame samples 492 are written to a frame buffer 496.

The reconstructed sample cache 460 operates similarly to the reconstructed sample cache 356 of the video encoder 114. The reconstructed sample cache 460 provides storage for reconstructed sample needed to intra predict subsequent CBs without the memory 206 (for example by using the data 232 instead, which is typically on-chip memory). Reference samples, represented by an arrow 464, are obtained from the reconstructed sample cache 460 and supplied to a reference sample filter 468 to produce filtered reference samples indicated by arrow 472. The filtered reference samples 472 are supplied to an intra-frame prediction module 476. The module 476 produces a block of intra-predicted samples, represented by an arrow 480, in accordance with the intra prediction mode parameter 458 signalled in the bitstream 133 and decoded by the entropy decoder 420.

When intra prediction is indicated in the bitstream 133 for the current CB, the intra-predicted samples 480 form the decoded PB 452 via a multiplexor module 484.

When inter prediction is indicated in the bitstream 133 for the current CB, a motion compensation module 434 produces a block of inter-predicted samples, represented as 438, using a motion vector and reference frame index to select and filter a block of samples from a frame buffer 496. The block of samples 498 is obtained from a previously decoded frame stored in the frame buffer 496. For bi-prediction, two blocks of samples are produced and blended together to produce samples for the decoded PB 452. The frame buffer 496 is populated with filtered block data 492 from an in-loop filtering module 488. As with the in-loop filtering module 368 of the video encoder 114, the in-loop filtering module 488 applies any, at least, or all of the DBF, the ALF and SAO filtering operations. The in-loop filtering module 368 produces the filtered block data 492 from the reconstructed samples 456.

Figure 5:
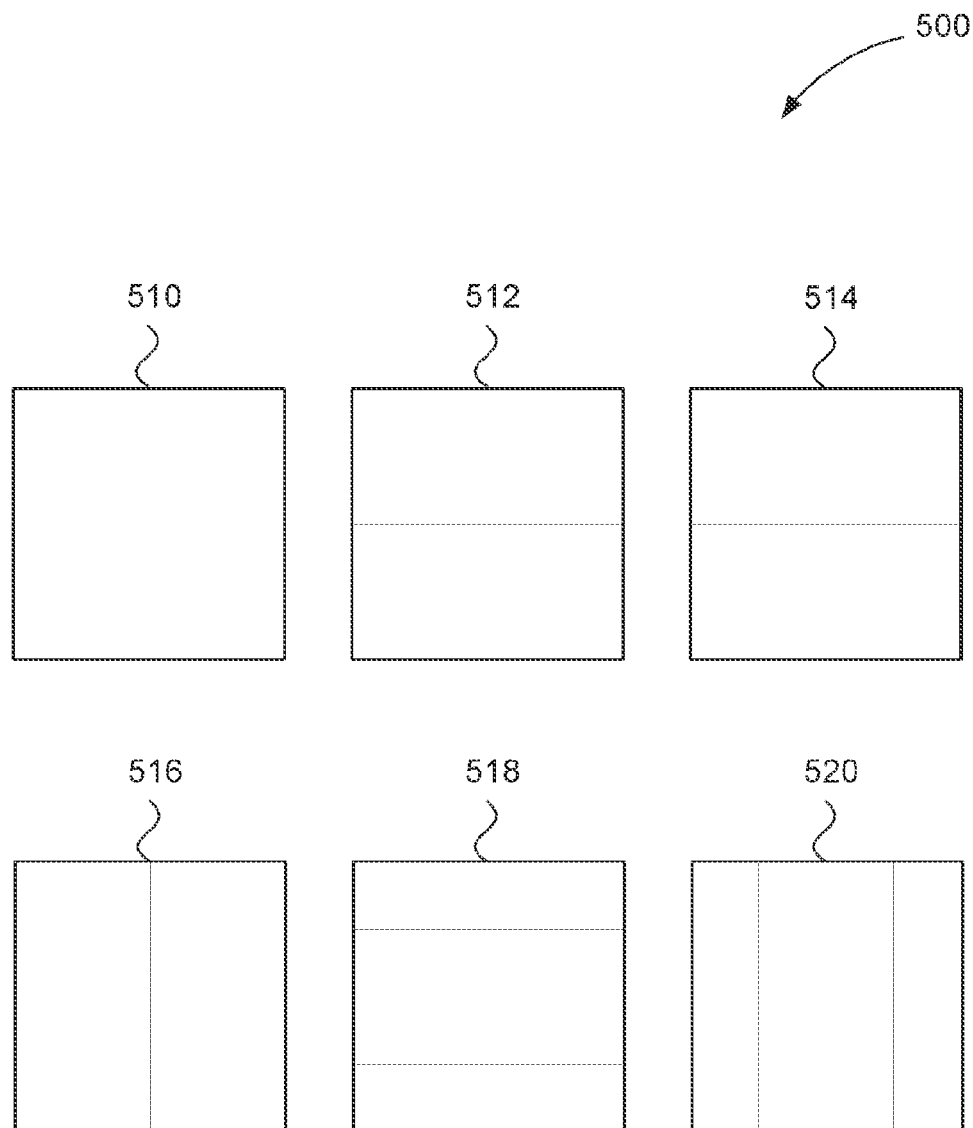
FIG. 5 is a schematic block diagram showing the available divisions of a block into one or more blocks in the tree structure of versatile video coding.

FIG. 5 is a schematic block diagram showing a collection 500 of available divisions or splits of a region into one or more sub-regions in the tree structure of versatile video coding. The divisions shown in the collection 500 are available to the block partitioner 310 of the encoder 114 to divide each CTU into one or more CUs or CBs according to a coding tree, as determined by the Lagrangian optimisation, as described with reference to FIG. 3.

Although the collection 500 shows only square regions being divided into other, possibly non-square sub-regions, it should be understood that the diagram 500 is showing the potential divisions but not requiring the containing region to be square. If the containing region is non-square, the dimensions of the blocks resulting from the division are scaled according to the aspect ratio of the containing block. Once a region is not further split, that is, at a leaf node of the coding tree, a CU occupies that region. The particular subdivision of a CTU into one or more CUs by the block partitioner 310 is referred to as the 'coding tree' of the CTU. The process of subdividing regions into sub-regions must terminate when the resulting sub-regions reach a minimum CU size. In addition to constraining CUs to prohibit sizes smaller than for example 4×4, CUs are constrained to have a minimum width or height of four. Other minimums, both in terms of width and height or in terms of width or height are also possible. The process of subdivision may also terminate prior to the deepest level of decomposition, resulting in a CU larger than the minimum CU size. It is possible for no splitting to occur, resulting in a single CU occupying the entirety of the CTU. A single CU occupying the entirety of the CTU is the largest available coding unit size. Moreover, CUs where no splitting occurs are larger than the processing region size. As a result of binary or ternary splitting at the highest level of a coding tree, CU sizes such as 64×128, 128×64, 32×128, and 128×32 are possible, each of which are also larger than the processing region size. Examples of CUS larger than the processing region size described further with reference to FIG. 10.

At the leaf nodes of the coding tree exist CUs, with no further subdivision. For example, a leaf node 510 contains one CU. At the non-leaf nodes of the coding tree exist either a split into two or more further nodes, each of which could either contain a leaf node that thus one CU or contain further splits into smaller regions.

A quad-tree split 512 divides the containing region into four equal-size regions as shown in FIG. 5. Compared to HEVC, versatile video coding (VVC) achieves additional flexibility with the addition of a horizontal binary split 514 and a vertical binary split 516. Each of the splits 514 and 516 divides the containing region into two equal-size regions. The division is either along a horizontal boundary (514) or a vertical boundary (516) within the containing block.

Further flexibility is achieved in versatile video coding with the addition of a ternary horizontal split 518 and a ternary vertical split 520. The ternary splits 518 and 520 divide the block into three regions, bounded either horizontally (518) or vertically (520) along ¼ and ¾ of the containing region width or height. The combination of the quad tree, binary tree, and ternary tree is referred to as 'QTBTTT'. The root of the tree includes zero or more quadtree splits (the 'QT' section of the tree). Once the QT section terminates, zero or more binary or ternary splits may occur (the 'multi-tree' or 'MT' section of the tree), finally ending in CBs or CUs at leaf nodes of the tree. Where the tree describes all colour channels, the tree leaf nodes are CUs. Where the tree describes the luma channel or the chroma channels, the tree leaf nodes are CBs.

Compared to HEVC, which supports only the quad tree and thus only supports square blocks, the QTBTTT results in many more possible CU sizes, particularly considering possible recursive application of binary tree and/or ternary tree splits. The potential for unusual (non-square) block sizes can be reduced by constraining split options to eliminate splits that would result in a block width or height either being less than four samples or in not being a multiple of four samples. Generally, the constraint would apply in considering luma samples. However, in the arrangements described, the constraint can be applied separately to the blocks for the chroma channels. Application of the constraint to split options to chroma channels can result in differing minimum block sizes for luma versus chroma, for example when the frame data is in the 4:2:0 chroma format or the 4:2:2 chroma format. Each split produces sub-regions with a side dimension either unchanged, halved or quartered, with respect to the containing region. Then, since the CTU size is a power of two, the side dimensions of all CUs are also powers of two.

Figure 6:
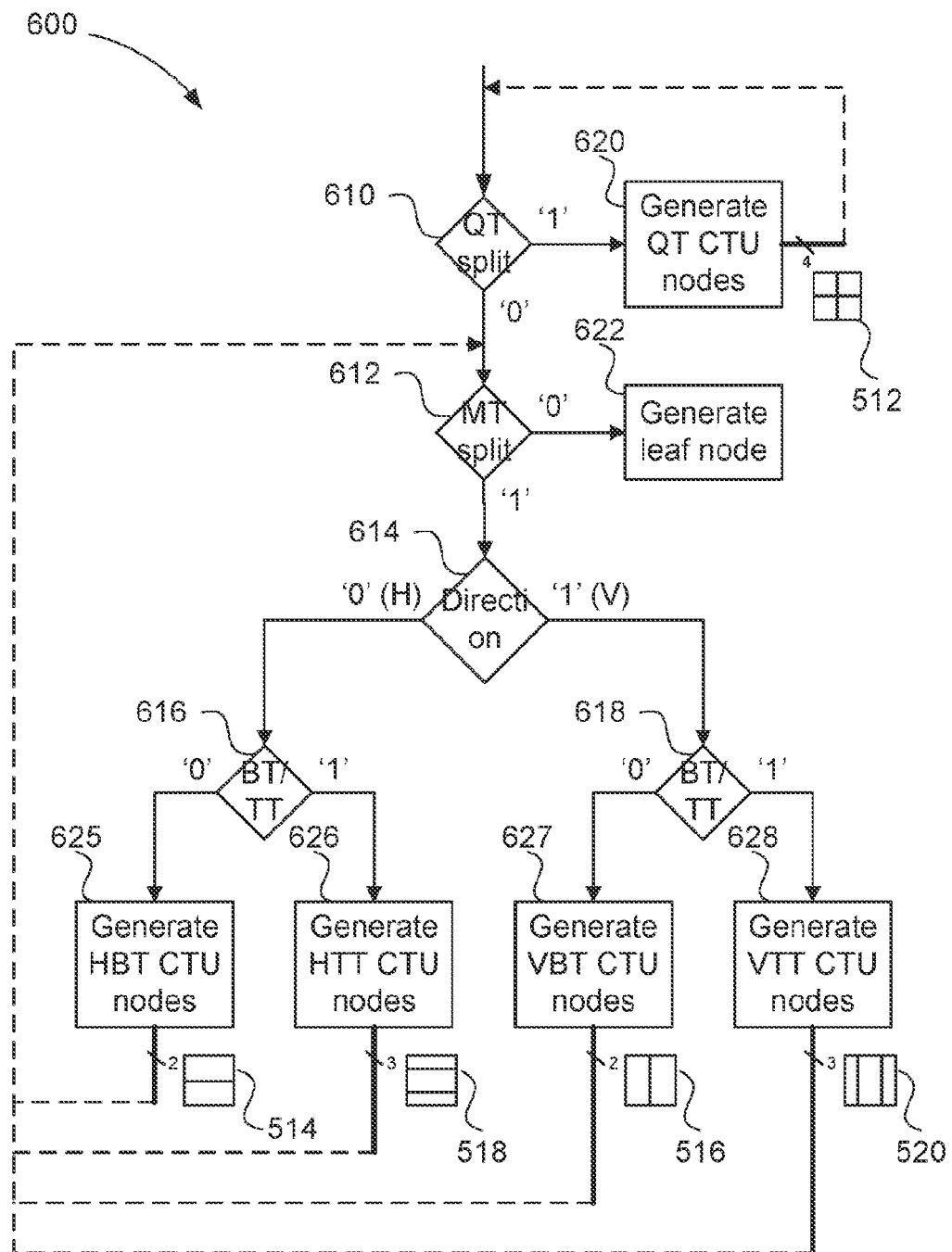
FIG. 6 is a schematic illustration of a dataflow to achieve permitted divisions of a block into one or more blocks in a tree structure of versatile video coding.

FIG. 6 is a schematic flow diagram illustrating a data flow 600 of a QTBTTT (or 'coding tree') structure used in versatile video coding. The QTBTTT structure is used for each CTU to define a division of the CTU into one or more CUs. The QTBTTT structure of each CTU is determined by the block partitioner 310 in the video encoder 114 and encoded into the bitstream 115 or decoded from the bitstream 133 by the entropy decoder 420 in the video decoder 134. The data flow 600 further characterises the permissible combinations available to the block partitioner 310 for dividing a CTU into one or more CUs, according to the divisions shown in FIG. 5.

Starting from the top level of the hierarchy, that is at the CTU, zero or more quad-tree divisions are first performed. Specifically, a Quad-tree (QT) split decision 610 is made by the block partitioner 310. The decision at 610 returning a '1' symbol indicates a decision to split the current node into four sub-nodes according to the quad-tree split 512. The result is the generation of four new nodes, such as at 620, and for each new node, recursing back to the QT split decision 610. Each new node is considered in raster (or Z-scan) order. Alternatively, if the QT split decision 610 indicates that no further split is to be performed (returns a '0' symbol), quad-tree partitioning ceases and multi-tree (MT) splits are subsequently considered.

Firstly, an MT split decision 612 is made by the block partitioner 310. At 612, a decision to perform an MT split is indicated. Returning a '0' symbol at decision 612 indicates that no further splitting of the node into sub-nodes is to be performed. If no further splitting of a node is to be performed, then the node is a leaf node of the coding tree and corresponds to a CU. The leaf node is output at 622. Alternatively, if the MT split 612 indicates a decision to perform an MT split (returns a '1' symbol), the block partitioner 310 proceeds to a direction decision 614.

The direction decision 614 indicates the direction of the MT split as either horizontal ('H' or '0') or vertical ('V' or '1'). The block partitioner 310 proceeds to a decision 616 if the decision 614 returns a '0' indicating a horizontal direction. The block partitioner 310 proceeds to a decision 618 if the decision 614 returns a '1' indicating a vertical direction.

At each of the decisions 616 and 618, the number of partitions for the MT split is indicated as either two (binary split or 'BT' node) or three (ternary split or 'TT') at the BT/TT split. That is, a BT/TT split decision 616 is made by the block partitioner 310 when the indicated direction from 614 is horizontal and a BT/TT split decision 618 is made by the block partitioner 310 when the indicated direction from 614 is vertical.

The BT/TT split decision 616 indicates whether the horizontal split is the binary split 514, indicated by returning a '0', or the ternary split 518, indicated by returning a '1'. When the BT/TT split decision 616 indicates a binary split, at a generate HBT CTU nodes step 625 two nodes are generated by the block partitioner 310, according to the binary horizontal split 514. When the BT/TT split 616 indicates a ternary split, at a generate HTT CTU nodes step 626 three nodes are generated by the block partitioner 310, according to the ternary horizontal split 518.

The BT/TT split decision 618 indicates whether the vertical split is the binary split 516, indicated by returning a '0', or the ternary split 520, indicated by returning a '1'. When the BT/TT split 618 indicates a binary split, at a generate VBT CTU nodes step 627 two nodes are generated by the block partitioner 310, according to the vertical binary split 516. When the BT/TT split 618 indicates a ternary split, at a generate VTT CTU nodes step 628 three nodes are generated by the block partitioner 310, according to the vertical ternary split 520. For each node resulting from steps 625-628 recursion of the data flow 600 back to the MT split decision 612 is applied, in a left-to-right or top-to-bottom order, depending on the direction 614. As a consequence, the binary tree and ternary tree splits may be applied to generate CUs having a variety of sizes.

The sets of allowed and disallowed splits at each node of a coding tree are further described with reference to FIG. 9.

Figure 7A:
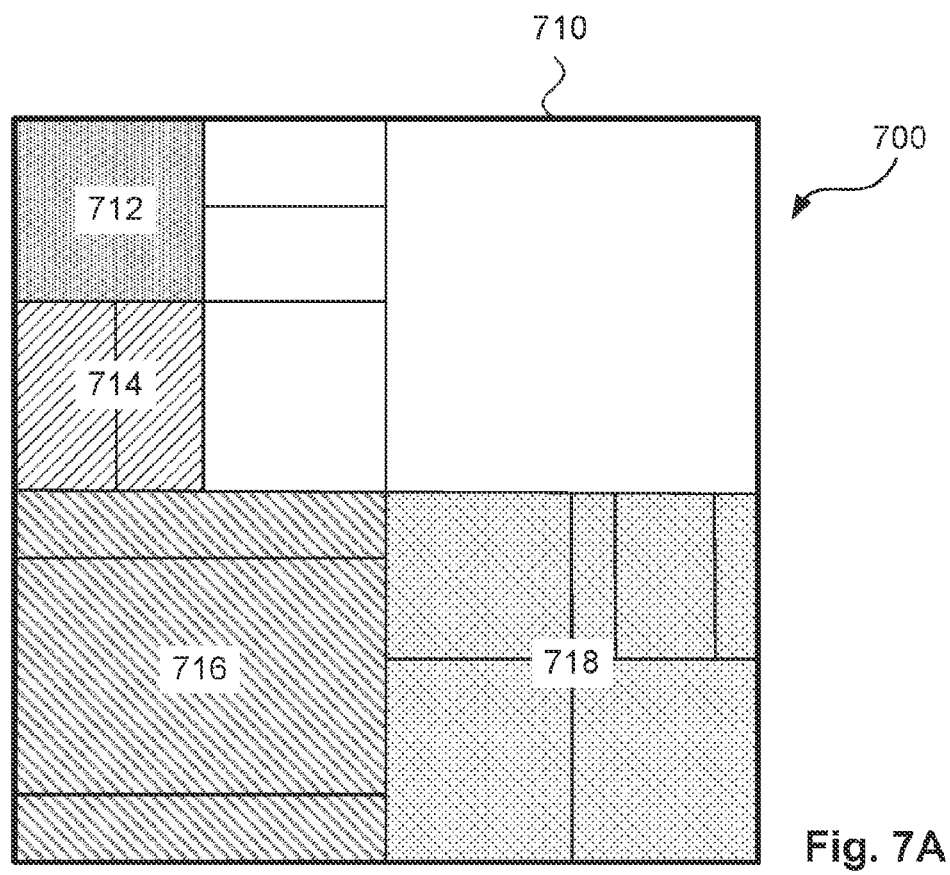
FIGS. 7A and 7B show an example division of a coding tree unit (CTU) into a number of coding units.
Figure 7B:
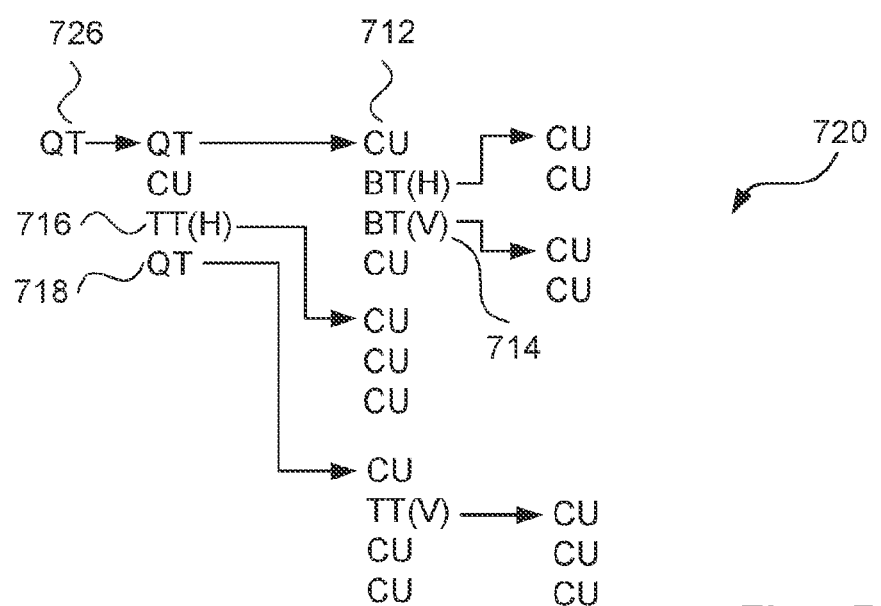

FIGS. 7A and 7B provide an example division 700 of a CTU 710 into a number of CUs or CBs. An example CU 712 is shown in FIG. 7A. FIG. 7A shows a spatial arrangement of CUs in the CTU 710. The example division 700 is also shown as a coding tree 720 in FIG. 7B.

At each non-leaf node in the CTU 710 of FIG. 7A, for example nodes 714, 716 and 718, the contained nodes (which may be further divided or may be CUs) are scanned or traversed in a 'Z-order' to create lists of nodes, represented as columns in the coding tree 720. For a quad-tree split, the Z-order scanning results in top left to right followed by bottom left to right order. For horizontal and vertical splits, the Z-order scanning (traversal) simplifies to a top-to-bottom scan and a left-to-right scan, respectively. The coding tree 720 of FIG. 7B lists all nodes and CUs according to the applied scan order. Each split generates a list of two, three or four new nodes at the next level of the tree until a leaf node (CU) is reached.

Having decomposed the image into CTUs and further into CUs by the block partitioner 310, and using the CUs to generate each residual block (324) as described with reference to FIG. 3, residual blocks are subject to forward transformation and quantisation by the video encoder 114. The resulting TBs 336 are subsequently scanned to form a sequential list of residual coefficients, as part of the operation of the entropy coding module 338. An equivalent process is performed in the video decoder 134 to obtain TBs from the bitstream 133.

The example of FIGS. 7A and 7B describes a coding tree applicable to both the luma channel and the chroma channel.

However, the example of FIGS. 7A and 7B also illustrates behaviour in terms of traversal of a coding tree applicable to just the luma channel or a coding tree applicable to just the chroma channels. For coding trees with many nested splits, the available split options at deeper levels are constrained by restrictions on available block sizes for the corresponding small regions. Restrictions on available block sizes for small regions are imposed to prevent a worst case of block processing rate being so high as to impose unreasonable burden on implementations. In particular, a constraint that block sizes are to be a multiple of 16 (sixteen) samples in chroma enables implementations to process samples at a granularity of 16 (sixteen) samples. Constraining block sizes to multiples of sixteen samples is particularly relevant to the 'intra reconstruction' feedback loop, that is the path in the video decoder 134 of FIG. 4 involving the modules 450, 460, 468, 476, and 484, and an equivalent path in the video encoder 114. In particular, constraining the block size to a multiple of 16 (sixteen) samples assists in maintaining throughput in intra prediction mode. For example, 'simultaneous data multiple instruction' (SIMD) microprocessor architectures commonly operate on wide words that may contain 16 samples. Also, hardware architectures may use wide busses, such as busses with a width of 16 samples to transfer samples along the intra reconstruction feedback loop. Were a smaller block size used, for example four samples, the bus would be underutilised, for example only one quarter of the bus width containing sample data. Although an underutilised bus could handle smaller blocks (that is, less than sixteen samples), in worst-case scenarios, such as many or all blocks being of relatively small size, the underutilisation could result in preventing real-time operation of an encoder (114) or decoder (134). For inter prediction, each block depends on reference samples obtained from a frame buffer (such as the buffer 372 or 496). As the frame buffer is populated with reference samples when processing a preceding frame, there is no feedback dependency loop affecting block-by-block operation for producing inter predicted blocks. In addition to the feedback dependency loop that relates to intra frame reconstruction, an additional and concurrent feedback loop exists that relates to determination of the intra prediction mode 458. The intra prediction mode 458 is determined by selecting a mode from a most probable mode list, or selecting a mode from a remaining mode list. Determination of the most probable mode list and the remaining mode list requires the intra prediction modes of neighbouring blocks. When relatively small block sizes are used, the most probable mode list and the remaining mode list need to be determined more frequently, that is, at a frequency governed by the block size in samples and the sampling rate of the channel.

Figure 8:
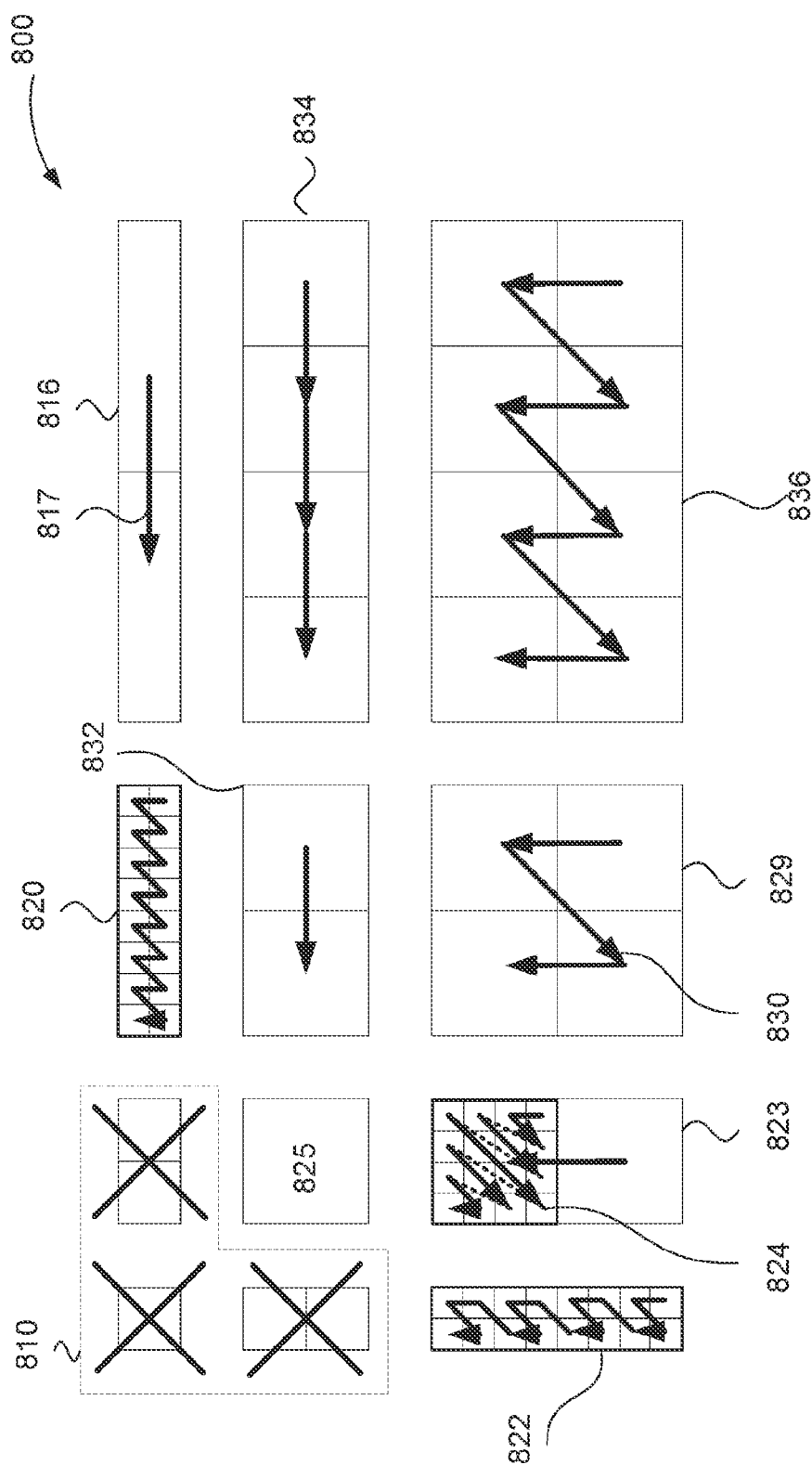
FIG. 8 is a diagram showing a collection of transform block sizes and associated scan patterns.

FIG. 8 is a diagram showing a collection 800 of transform block sizes and associated scan patterns for the chroma channels that result from the use of a 4:2:0 chroma format. The collection 800 may also be used for the 4:2:2 chroma format. The arrangements described are suitable for use with image frames having a chroma format wherein chroma channels of the image frame are subsampled relative to a luma channel of the image frame, in particular for 4:2:0 and 4:2:2 formats. The collection 800 does not include all possible chroma transform block sizes. Only chroma transform blocks with a width of less than or equal to sixteen or a height of less than or equal to eight are shown in FIG. 8. Chroma block with greater width and height may occur but are not shown in FIG. 8 for ease of reference. The additional chroma transform sizes are 2×16, 4×16, 8×16, 16×16, and 32×32 for the case where the coding tree is shared between the luma and chroma channels. For the case where the coding tree of the chroma channels is separate to the coding tree of the luma channel (a 'dual coding tree'), the following additional chroma transform sizes are also available: 2×32, 4×32, 8×32, 16×32, 32×2, 32×4, 32×8, and 32×16. However, the collection 800 demonstrates an approach for scanning TBs which can similarly be applied for scanning larger TBs.

A set of prohibited transform sizes 810 includes transform block sizes 2×2, 2×4, and 4×2, all of which have areas of less than sixteen samples. In other words, a minimum transform size of 16 (sixteen) chroma samples results from operation of the arrangements described, in particular for intra predicted CBs. Instances of the prohibited transform sizes 810 are avoided by determining split options as described with reference to FIG. 9. Residual coefficients in transforms are scanned in a two layer approach where the transform is divided into 'sub-blocks' (or 'coefficient groups'). Scanning takes place along a scan path from the last significant (non-zero) coefficient back towards the DC (top left) coefficient. The scan path is defined as the progression within each sub-block (the 'lower layer') and the progression from one sub-block to the next (the 'upper layer'). In the collection 800, an 8×2 TB 820 uses an 8×2 sub-block, i.e. a sub-block containing sixteen residual coefficients. A 2×8 TB 822 uses a 2×8 sub-block, i.e. also containing sixteen residual coefficients.

TBs having a width or height of two, and the other dimension a multiple of eight, use multiple 2×8 or 8×2 sub-blocks. Accordingly, chroma blocks in some instances having a width of two samples are coded using a division of the block into sub-blocks, each of size 2×8 samples and chroma blocks having a height of two samples are in some instances coded using a division of the block into sub-blocks, each of size 8×2 samples. For example, a 16×2 TB 816 has two 8×2 sub-blocks, each sub-block being scanned as shown for to the TB 820. The progression of scanning from one sub-block to the next as shown in sub-block progression 817.

A 2×32 TB (not shown in FIG. 8) uses four 2×8 sub-blocks, arranged as a one by four array. Residual coefficients in each sub-block are scanned as shown for the 2×8 TB 822, with sub-blocks progressing from the lowest sub-block up to the uppermost sub-block of the one by four array.

Larger TBs follow a similar scan progression. For all TBs with width and height each being greater than or equal to four, a 4×4 sub-block scan is used. For example, a 4×8 TB 823 uses a 4×4 sub-block scan 824, with a progression from the lower sub-block to the upper sub-block. A 4×4 TB 825 can be scanned in a similar manner. An 8×8 TB 829 uses a progression 830 for the four 4×4 sub-blocks. In all cases the scan within a sub-block and the progression from sub-block to sub-block follows a backward diagonal scan, i.e. the scan progresses from the 'last' significant residual coefficient back towards the top-left residual coefficient of the TB. FIG. 8 also shows scan order across an 8×4 TB 832, a 16×4 TB 834 and a 16×8 TB 836 for example. Moreover, depending on the position of the last significant coefficient along the scan path, only the portion of the sub-block containing the last significant residual coefficient from the last significant coefficient position back to the top-left residual coefficient of the sub-block needs to be scanned. Sub-blocks further along the scan path in a forward direction (i.e. closer to the bottom right of the block) do not need to be scanned. The collection 800 and in particular the prohibited transform sizes 810 impose restrictions on the ability to split regions (or nodes) of a coding tree into sub-regions (or sub-nodes), as described with reference to FIG. 9.

In a VVC system using 2×2, 2×4 and 4×2 TBs (the set of TBs 810), a 2×2 sub-block may be employed for TBs of width and/or height of two samples. As described above, use of TBs 810 increases throughput constraints in the intra reconstruction feedback dependency loop. Moreover, use of a sub-block with only four coefficients increases the difficulty of parsing residual coefficients at higher throughput. In particular, for each sub-block a 'significance map' indicates the significance of each residual coefficient contained therein. Coding of a one-valued significance flag establishes the magnitude of the residual coefficient as being at least one and coding of a zero-valued flag establishes the magnitude of the residual coefficient as zero. Residual coefficient magnitude (from one onwards) and sign is only coded for 'significant' residual coefficients. No significance bit is coded and a magnitude (from zero) is always coded for the DC coefficient. High-throughput encoders and decoders may need to encode or decode multiple significance map bins per clock cycle to maintain real-time operation. The difficulty of multi-bin encoding and decoding per cycle is increased when inter-bin dependencies are more numerous, for example when a smaller sub-block size is used. In the system 100 sub-block sizes are 16 (notwithstanding the exception of the sub-block containing the last significant coefficient), regardless of block size.

Figure 9:
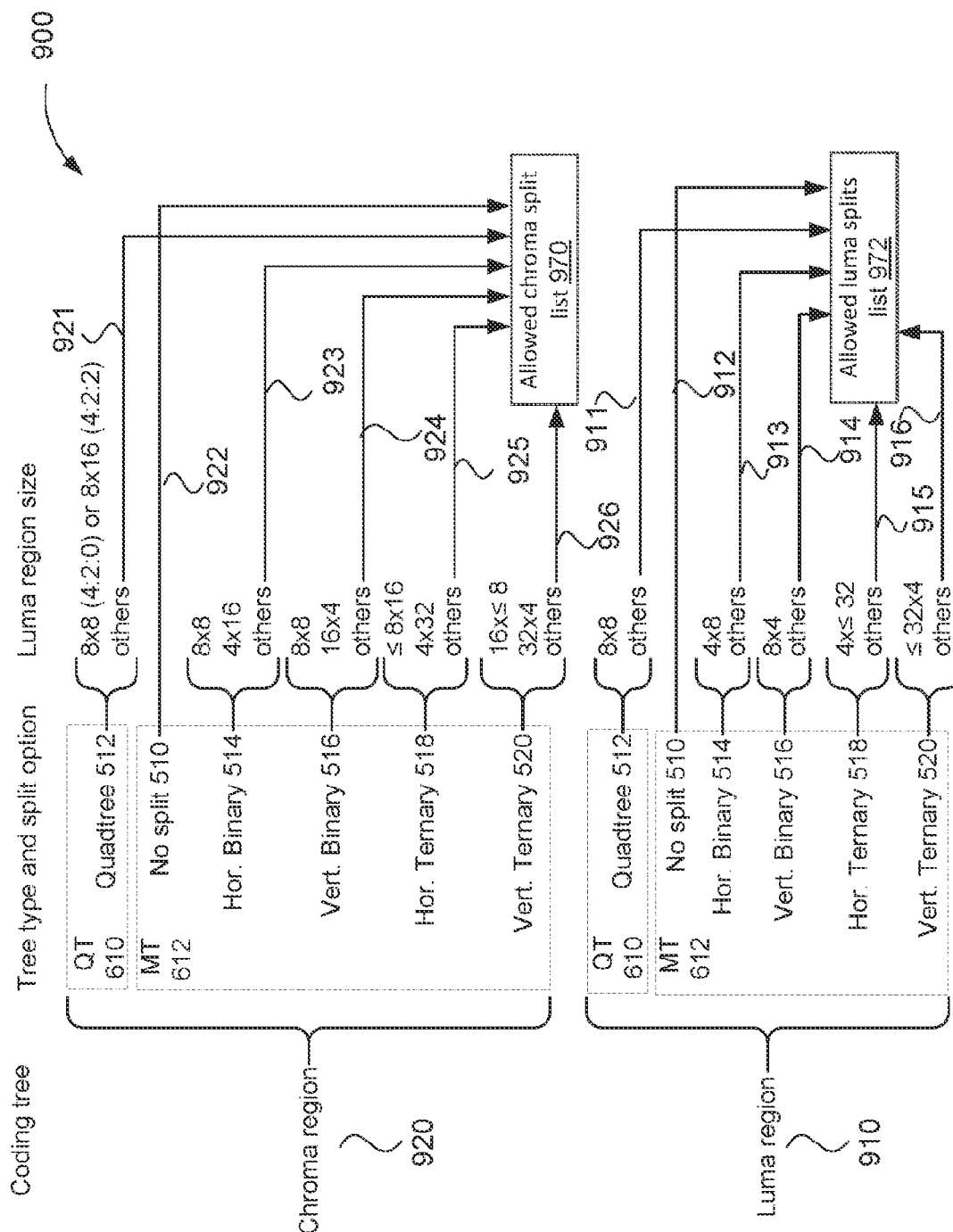
FIG. 9 is a diagram showing rules for generating lists of allowed splits in a luma coding tree and a chroma coding tree.

FIG. 9 is a diagram showing a set of rules 900 for generating lists of allowed splits in a luma coding tree and a chroma coding tree when intra prediction is in use. For particular frames, including the first frame of a sequence of frames, all blocks use intra prediction. Other frames may allow a mixture of inter predicted and intra predicted blocks. Although the full set of available splits of a coding tree has been described with reference to FIG. 6, restrictions on available transform sizes impose constraints on the specific split options for a given region size. As described below, split options for each of the luma and chroma channels are determined according to dimensions of a region of a corresponding coding tree unit.

As VVC allows use of different coding trees for luma and chroma samples, the split options allowable for chroma samples are different to the split options for luma samples. The set of rules 900 is accordingly divided into a set of rules 920 for a chroma region and a set of rules 910 for a luma region. Separate rules are shown for the luma coding tree and the chroma coding tree, enabling a different collection of transform blocks to be used for the luma channel and the chroma channels. In particular, there is no requirement that the collection of blocks available for the luma channel and the chroma channels are related by chroma format. In traversing the nodes of a coding tree, a list of allowed splits is obtained by checking the availability of a set of split options with the region size. Split options that result in regions that may themselves be coded using CBs are added to the list of allowed splits. For a region to be coded using a CB, the region size must enable coding with an integer number of transforms of a particular size from the collection 800. The particular size is selected to be the largest size that does not exceed the region size (considering both width and height). As such, for smaller regions a single transform is used and where the region size exceeds that of the largest available transform, the largest available transform is tiled to occupy the entirety of the region.

When processing a chroma region with the set 920, an initial split list of split options is generated. Each split option is tested against the region size to determine if the split option would result in sub-regions of a prohibited size, that is smaller than the size of the transforms of the collection 800. Split options resulting in sub-regions of allowed sizes, that is matching an integer number of the minimum transform size of the collection 800, are added to an allowed chroma split list 970.

For example, if in QT mode (corresponding to the decision 610 of FIG. 6), quadtree splits are not allowed if the region is of size 8×8 in 4:2:0 format or 8×16 in 4:2:2 format as the split would result in transform sizes of 2×2 or 2×4 respectively for the chroma channels. The region sizes that are allowable are indicated by an arrow 921. Similarly, other allowable splits for the chroma rule set 920 are indicated by arrows 922 923, 924, 925 and 926 and as discussed in relation to FIGS. 10 and 11 below.

Region sizes for the chroma channels are described in terms of the luma sample grid. For example, a 8×4 region corresponds to a 4×2 transform for the chroma channels when the 4:2:0 chroma format is in use. When the 4:2:2 chroma format is in use, a 8×4 region corresponds to a 4×4 transform in chroma. When the 4:4:4 chroma format is in use, chroma is not subsampled with respect to luma and so the transform size in chroma corresponds to the region size.

Allowable luma transform splits relate to a different minimum size constraint, with 4×4 disallowed. Although a 4×4 luma PB meets the requirement of being a multiple of 16 samples, the sample rate in luma is four times the sample rate of each chroma channel for video in the 4:2:0 chroma format. Even though 4×4 luma prediction blocks do not lead to bus underutilisation (for example in SIMD architectures or bus architectures of 16 samples in width), it is difficult for the intra reconstruction feedback loop and the intra prediction mode determination feedback loop to accommodate operation at relatively high sample rates. Prohibiting 4×4 blocks in the luma channel reduces the severity of feedback loops to a level at which implementation at high sample rates is feasible. Similarly to the rule set 920, allowable splits in the set 910 are shown by arrows 901 to 906 and used to generate a list 972 of allowable splits. The allowable split options are further described in relation to FIGS. 10 and 11 below.

Figure 10:
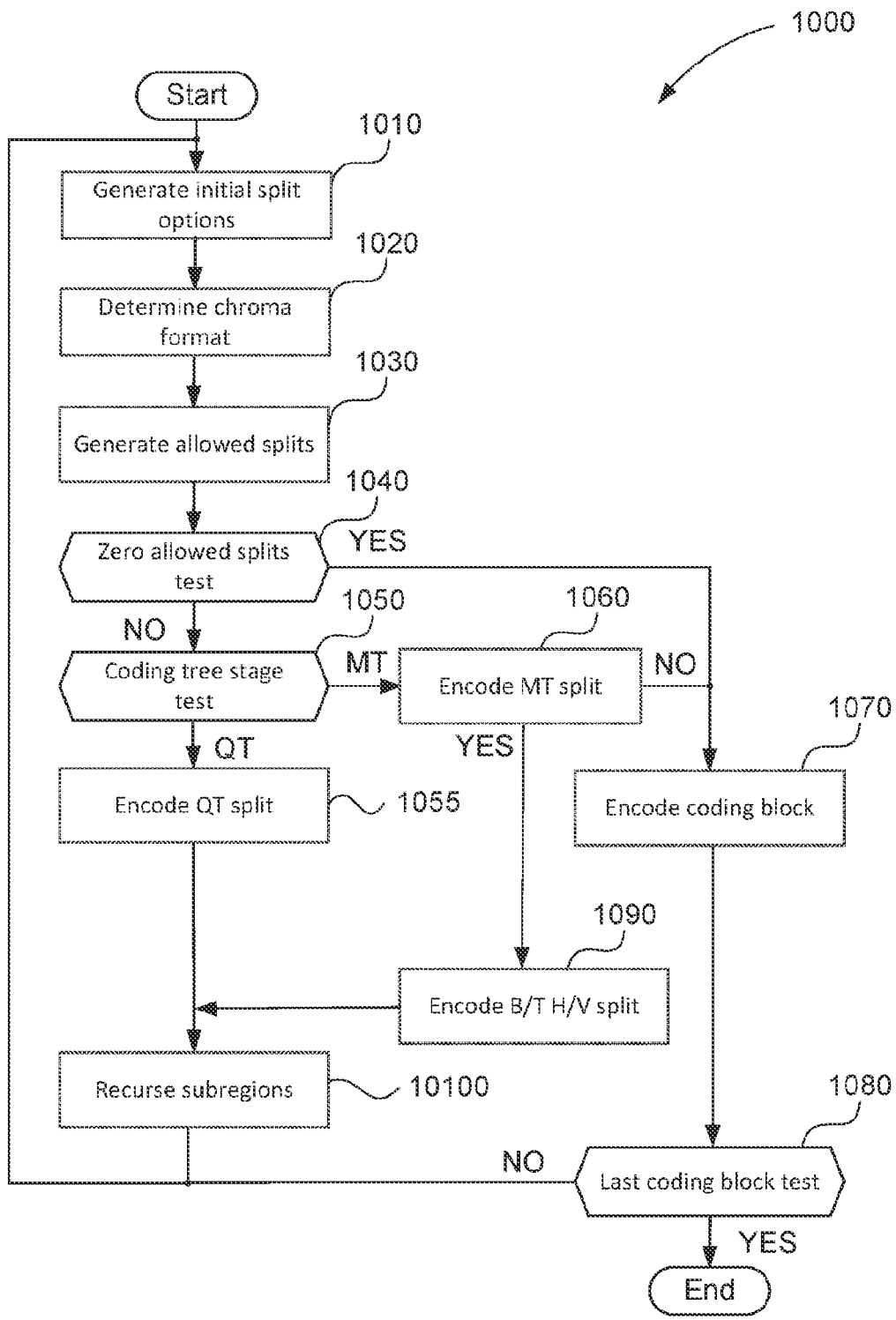
FIG. 10 is a flow diagram of a method for encoding a coding tree of an image frame into a video bitstream.

FIG. 10 shows a method 1000 of encoding a coding tree of an image frame into a video bitstream. The method 1000 is performed for each of the luma coding tree and the chroma coding tree, as described with reference to FIG. 12, resulting in determining each coding tree for a CTU and encoding the resulting coding trees into the bitstream 115. The method 1000 may be embodied by apparatus such as a configured FPGA, an ASIC, or an ASSP. Additionally, the method 1000 may be performed by video encoder 114 under execution of the processor 205. As such, the method 1000 may be stored on computer-readable storage medium and/or in the memory 206. The method 1000, invoked for the luma coding tree and the chroma coding tree of each CTU, commences at a generate initial split options step 1010, with a 'current node' (or current region)' being the root of the luma or coding tree, i.e. a region occupying the entire CTU. The method 1000 is implemented by the encoder 114 for each of the luma and chroma coding trees when the frame data 113 is received by the block partitioner 310.

At the generate initial split options step 1010, the processor 205 generates split options for the current node of the coding tree. The split options are generated for the luma channel or the chroma channel, depending upon the iteration of the method 1000. Initially, the coding tree is in a quadtree (QT) stage where the only allowed split is a quadtree split (the split 512 of FIG. 5), or a cessation of splitting (see 510 of FIG. 5). Moreover, for a frame or slice coded to use only intra predicted blocks, the luma and chroma coding trees include a quadtree split at their root nodes. Consequently, for a 128×128 CTU, the largest luma intra predicted CB is 64×64 and the largest chroma intra predicted CB is 32×32 when the 4:2:0 chroma format is used. For a frame of a slice coded to use either or both of intra predicted and inter predicted blocks, the luma and chroma coding trees do not need to include a quadtree split at their root nodes. However, intra predicted CBs are not permitted to span boundaries of a 64×64 luma sample grid. When quadtree splitting has ceased, the coding tree is said to be in the multi-tree (MT) stage, corresponding to decision 312 of FIG. 6. In the multi-tree stage, the split options are to (i) cease splitting (i.e. 510), in which case the region corresponding to the current node is coded using a CB, or (ii) continue splitting. As initial split options, binary and ternary splits in both horizontal and vertical directions (see 514-520 of FIG. 5) may be used. As a result of the step 1010, a list of all possible splits for the coding tree stage (i.e. QT or MT) is created. Control in the processor 205 progresses from step 1010 to a determine chroma format step 1020.

At the determine chroma format step 1020 the processor 205 determines the chroma format of the frame data 113 as one of the 4:2:0 chroma format or the 4:2:2 chroma format. The chroma format is a property of the frame data and does not change during operation. The chroma format thus is provided to the video encoder 113 by means such as a configuration file or register. The determined chroma format is encoded in the bitstream 113, for example using a 'chroma_format_idc' syntax element, only encoded once for the video. Control in the processor 205 progresses from the step 1020 to a generate allowed splits step 1030.

At the generate allowed splits step 1030, the processor 205 applies rules to constrain allowed split types to each split option of the step 1010 to produce an allowed split list. When processing the luma coding tree, an allowed luma splits list 972 is created by execution of step 1030. When processing the chroma coding tree, an allowed chroma splits list 970 is created in execution of step 1030. The rules constraining allowed split types consider the available transform sizes in each of the luma channel and the chroma channel.

Generally, for an N×M transform in the luma channel there is an N/2×M/2 transform available for the chroma channels when the 4:2:0 chroma format is used or an N/2×M transform available for the chroma channels when the 4:2:2 chroma format is used. As such, the split rules are generally equivalent for the luma and chroma channels. However, there are exceptions for small block sizes. In particular, the 4×8, and 8×4 luma transforms do not have corresponding 2×4, and 4×2 transforms in chroma. Also disallowed are splits resulting in a 4×4 luma transform or a 2×2 chroma transform. The rules are equivalent in the luma channel and the chroma channel, since the region size of the 2×2 chroma transform is 4×4 luma samples for the 4:2:0 chroma format.

To the extent that the transform set of luma is different to the transform set of chroma, there are differences in the allowed split options between luma and chroma. When processing a luma node in the coding tree, for each split option (510-520 as shown in FIG. 9) the region size of the luma node is evaluated. The no split case (510) is always allowed and thus always added to the allowed luma split list 972 as shown by the arrow 912. The quadtree split (512) is disallowed when the region size is 8×8, avoiding using the disallowed 4×4 luma transform size. For larger region sizes, the quadtree split is allowed and is added to the allowed luma split list 972 as shown by the arrow 911. When in the MT stage of the luma coding tree, the following splits are disallowed to prevent use of a 4×4 transform in luma:

Horizontal binary split of 4×8 region (avoid pair of 4×4 blocks). Remaining splits are allowed, as shown by the arrow 913.

Vertical binary split of 8×4 region (avoid pair of 4×4 blocks). Remaining splits are allowed, as shown by the arrow 914.

Horizontal ternary split of 4×16 or smaller region (avoid first and third blocks of split being 4×4 blocks). Remaining splits are allowed, as shown by the arrow 915.

Vertical ternary split of 16×4 or smaller region (avoid first and third blocks of split being 4×4 blocks). Remaining splits are allowed, as shown by the arrow 916.

Additionally, any split in luma that would result in a block having a width of height of less than four is prohibited. Provided that restrictions on splitting due to avoidance of width or height being less than four and block size being 4×4 are not encountered, the split is added to the allowed luma split list 972.

When processing a chroma node in a chroma coding tree, for each split option the corresponding rule regarding region size of the node is consulted to determine whether to add the split option to the allowed chroma split list 970. As with the luma coding tree, the chroma coding tree begins in a 'QT' stage (corresponding to the decision 610 of FIG. 6) where either a quadtree split 512 or no split 510 is allowed. Once a no split 510 has occurred the coding tree enters the 'MT' stage (corresponding to the decision 612 of FIG. 6). At the MT stage, either (i) a no-split indicates presence of a CB occupying the region associated with the node, or (ii) one of the splits 514-520 occurs. Occurrence of one of the splits 514-520 divides the region into sub-regions. Each of the resultant sub-regions is evaluated also to determine allowed split options.

If, in the QT stage of a coding tree and using 4:2:0 chroma format, the node has a region size has reached 8×8 (i.e. 4×4 chroma transform), no further quadtree splits are possible. Further no other split options are available. The option available is to have a 'no split' added to the allowed chroma split for the node. As a consequence, a single 4×4 CB exists at the node.

If, in the QT stage of a coding tree and using a 4:2:2 chroma format, the node has a region size of 8×16 (i.e. 4×8 chroma transform), no further quadtree splits are possible and step 1030 enters the MT stage of the coding tree. A 8×16 region in the MT stage may have a single 4×8 chroma transform or may have a horizontal split resulting in two 8×8 regions and hence a pair of 4×4 chroma transforms or a vertical split resulting in two 4×16 regions and hence a pair of 2×8 chroma transforms. In the chroma coding tree in the MT stage, splits that would result in regions of size 4×4, 4×8, and 8×4 and hence introduce transforms of size 2×2, 2×4 and 4×2 are prohibited, and are listed as follows:

Horizontal binary split of 8×8 region (avoid pair of 4×2 chroma transforms) or 4×16 region (avoid pair of 2×4 chroma transforms). Remaining splits are allowed, as shown by the arrow 923.

Vertical binary split of 8×8 region (avoid pair of 2×4 chroma transforms) or 16×4 region (avoid pair of 4×2 chroma transforms). Remaining splits are allowed, as shown by the arrow 924.

Horizontal ternary split of 4×16 region (avoid first and third subregion using 2×2 chroma transforms and centre 2×4 subregion using chroma transform) or 8×16 region (avoid 2×4 chroma transforms in first and third subregion). Remaining splits are allowed, as shown by the arrow 925.

Vertical ternary split of 16×4 region (avoid first and third subregion using 2×2 chroma transforms and centre 4×2 subregion using chroma transform) or 16×8 region (avoid 4×2 chroma transforms in the first and third subregion). Remaining splits are allowed, as shown by the arrow 926.

In addition to the above constraints, splits that would result in subregions having a width or height of less than two are prohibited. Considering each split option of the step 1010, the above rules are consulted and split options that are not prohibited are added to the chroma split option list 970 in execution of step 1030. Once the initial split options have been refined to a list of allowed splits (the list 970 for chroma and the list 972 for luma), the block partitioner 310 selects one of the allowed splits by evaluating prediction modes and coding costs according to a Lagrangian optimisation. Control in the processor 205 progresses from step 1030 to a zero allowed splits test 1040.

At the zero allowed splits test 1040 the processor 205 tests if the split option list (970 or 972) contains only a 'no split' entry (the split. 510). If so ("YES" at step 1040), no further splits are possible. A CB exists at the current node and control in the processor 205 progresses to an encode coding block step 1070. If splits are possible ("NO" at step 1040) then control in the processor 205 progresses to a coding tree stage test step 1050.

At the coding tree stage test step 1050 the processor 205 checks the stage of the present node in the coding tree, that is whether the stage is QT or MT. If the node is in the QT stage, the decision of the block partitioner 310 is to remain in the QT stage and control in the processor 205 progresses to an encode QT split step 1055. If the node is in the MT stage or the decision of the block partitioner 310 is to transition from the QT stage to the MT stage for the current node of the coding tree, control in the processor 205 progresses to an encode MT split step 1060.

At the encode QT split step 1055 the entropy encoder 338, under execution of the processor 205, encodes a QT split flag (as described in relation to the decision 610 of FIG. 6) with a value of '1' into the bitstream 115. The QT split flag with a value of 1 indicates a division of the current node into four sub-modes, that is the quadtree split 512. Control in the processor 205 progresses from step 1055 to a recurse subregions step 10100.

At the encode MT split step 1060 the entropy encoder 338, under execution of the processor 205, encodes further flags into the bitstream 115 to indicate the type of MT split. If the current node is at a transition from the QT stage to the MT stage of the coding tree, a QT split flag (as described in relation to the decision 610 of FIG. 6) with a value of '0' is encoded into the bitstream 115. If at least one split other than the 'no split' case is allowed, as determined at the step 1030, an MT split flag indicates the selection of a no split 510 (encode a '0' for an MT split flag, see the decision 612 of FIG. 6). The step 1060 returns a "NO" and control in the processor 205 progresses to the encode coding block step 1070.

Otherwise, the selection of one of the splits 514-520 by the block partitioner 310 is indicated by encoding a '1' for an MT split flag, i.e. 612. The step 1060 returns "YES" and control in the processor 205 progresses to an encode B/T H/V split step 1090.

At the encode coding block step 1070 the entropy encoder 338, under execution of the processor 205, encodes the prediction mode and residual coefficients of the coding block into the bitstream 115. For intra predicted CBs, an intra-prediction mode is encoded and for inter predicted CBs, a motion vector is coded. The residual coefficients are encoded according to a scan progressing from the last significant residual coefficient in the scan path back towards the DC coefficient of the block.

Further, the coefficients are grouped into 'sub-blocks', for which a coded sub-block flag is encoded if appropriate indicating the presence of at least one significant residual coefficient in the sub-block. If no significant residual coefficients are present in the sub-block, there is no need to code individual significance flags for each residual coefficient in the sub-block. The sub-block that contains the last significant residual coefficient does not require a coded sub-block flag. A coded sub-block flag is not coded for the sub-block containing the DC (top left of the block) residual coefficient. Sub-block sizes are always 4×4 in luma and in chroma are one of 2×8 or 4×4 or 8×2 for a given block, as shown in FIG. 8. Thus, the sub-block size is always 16, which accords with block sizes that are always a multiple of 16, as is the case in the collection 800. Control in the processor 205 progresses to from step 1070 to a last coding block test step 1080.

At the last coding block test 1080, the processor 205 determines whether the current coding block is the last CB in the coding tree. By virtue of the hierarchical Z-order scan, the last CB is the CB occupying the lower-right corner of the CTU. If the current CB is the last one in the coding tree ("YES" at step 1080), the method 1000 terminates. Once the method 1000 has processed the luma coding tree, the method 1000 is invoked to process the chroma coding tree. The processor 205 may perform two instances of method 1000 in parallel to process the luma coding tree and the chroma coding tree. If the two instances of the method 1000 are performed in parallel the entropy encoder 338 performs operation on luma and chroma in a serialised manner to produce a deterministic bitstream. That is, the bitstream produced by a parallel encoder must be decodeable by a serial decoder. Otherwise, if the step 1080 returns "NO", the current node progresses to the next node according to the hierarchical Z-order scan, as exemplified in FIGS. 7A and 7B. Control in the processor 205 progresses to the generate initial split options step 1010.

At the encode B/T H/V split step 1090 the entropy encoder 338, under execution of the processor 205, encodes additional flags into the bitstream 115 indicating which split of the allowed split list was selected by the block partitioner 310. If the allowed split list includes only one split other than the 'no split' case, the one split must have been selected by the block partitioner 310 and there is no need to encode additional flags to identify the split. If the list of allowed splits includes splits in both horizontal and vertical directions, the entropy encoder 338 encodes a flag indicating the direction of the split that was selected by the block partitioner 310. If the list of allowed splits includes both binary and ternary splits, the entropy encoder 338 encodes a flag indicating the type (i.e. binary or ternary) of the split that was selected by the block partitioner 310. Control in the processor 205 progresses from step 1090 to the recurse subregions step 10100.

At the recurse subregions step 10100 the processor 205 generates subregions according to the determined split of the step 1030. The method 1000 is recursively invoked for each of generated subregions or nodes, resulting in a recursion throughout the coding tree. Recursive invocation of the method 1000 progresses from one subregion or node to the next in accordance with a hierarchical Z-order scan of the coding tree, as shown in FIGS. 7A and 7B. When the child nodes resulting from a split have been processed by the method 1000 to generate subregions, the recursion progresses to the next sibling node in the coding tree. If there are no further sibling nodes, the recursion progresses to the parent node, at which point the next node (e.g. a sibling of the parent) is selected as the next node for which subregions are to be generated. Where the parent node is in the QT stage of the coding tree, the return to a parent node results in returning to the QT stage of the coding tree.

Accordingly, each of the steps 1055, 1060, 1090, and 1070 operates to encode flags for the determined allowable split options to the bitstream. Each split option is determined for one of chroma or luma channels. The split options can be determined based upon dimensions of regions of coding tree.

Figure 11:
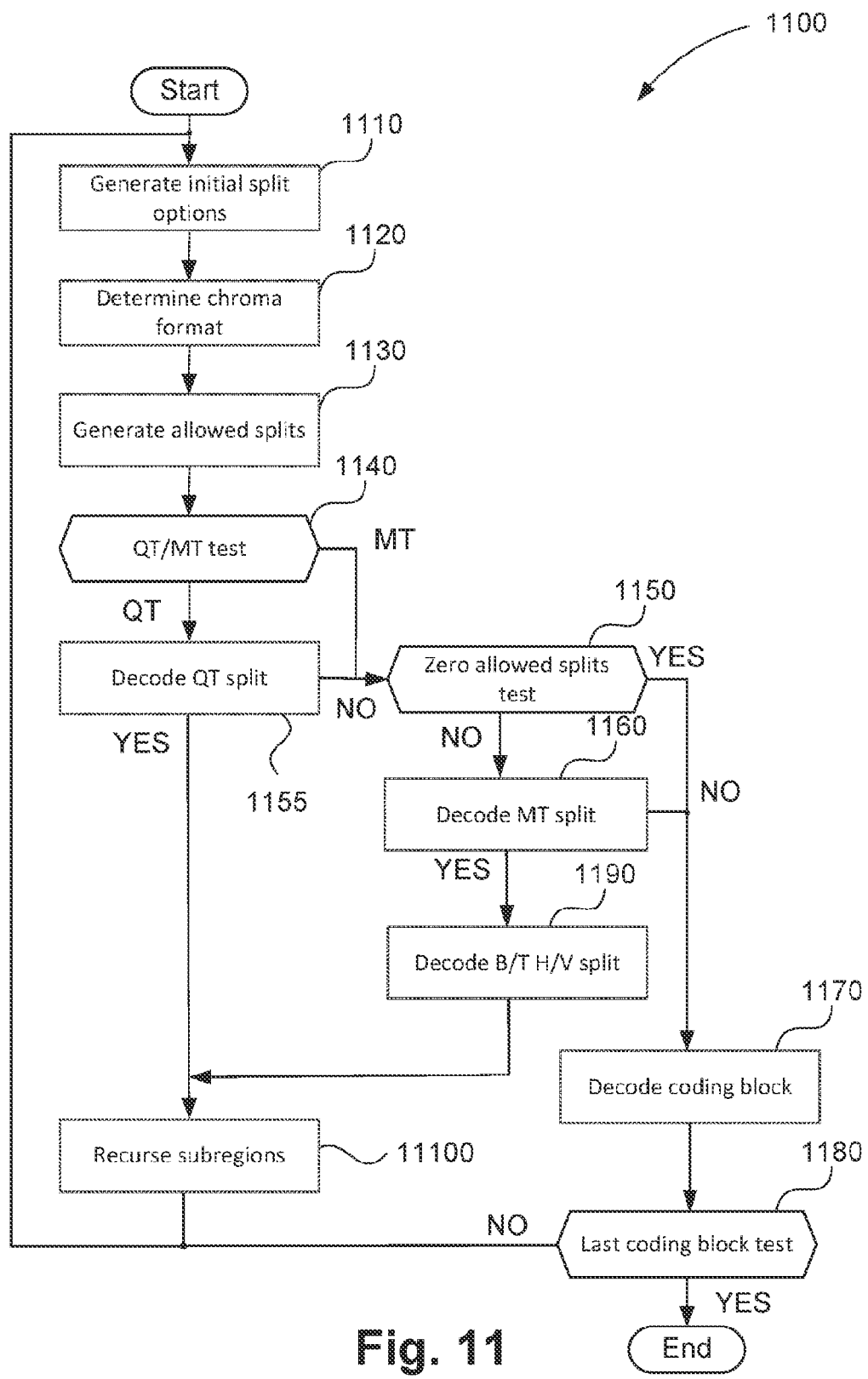
FIG. 11 is a flow diagram of a method for decoding a coding tree of an image frame from a video bitstream.

FIG. 11 shows a method 1100 for decoding a coding tree in an image frame from a video bitstream. The method 1100 is performed for each of the luma coding tree and the chroma coding tree, as described with reference to FIG. 13, resulting in decoding each coding tree for a CTU and from the bitstream 133. The method 1100 may be embodied by apparatus such as a configured FPGA, an ASIC, or an ASSP. Additionally, the method 1100 may be performed by video decoder 134 under execution of the processor 205. As such, the method 1100 may be stored on computer-readable storage medium and/or in the memory 206. The method 1100, invoked for the luma coding tree and the chroma coding tree of each CTU, commences at a generate initial split options step 1110, with a 'current node' (or current region) being the root of the luma or coding tree, that is a region occupying the entire CTU.

At the generate initial split options step 1110, the processor 205 generates split options for the current node of the coding tree. Initially, the coding tree is in a quadtree (QT) stage where the only allowed split is a quadtree split (the split 512), or a cessation of splitting (the split 510). Moreover, for a frame or slice coded to use only intra predicted blocks, the luma and chroma coding trees include a quadtree split at their root nodes. When quadtree splitting has ceased, the coding tree is said to be in the multi-tree (MT) stage. In the multi-tree stage, the split options are to cease splitting (use 510), in which case the region corresponding to the current node is coded using a CB, or to continue splitting. As initial split options, binary and ternary splits in both horizontal and vertical directions (splits 514-520) are available. As a result of the step 1110, a list of all possible splits for the coding tree stage (i.e. QT or MT) is created. Control in the processor 205 progresses to a determine chroma format step 1120.

At the determine chroma format step 1120 the processor 205 determines the chroma format of the frame data 135 as one of the 4:2:0 chroma format or the 4:2:2 chroma format. For example, a 'chroma_format_idc' syntax element may be read from the bitstream 113 by the entropy decoder 420, under execution of the processor 205, to determine the chroma format. Control in the processor 205 progresses from the step 1120 to a generate allowed splits step 1130.

At the generate allowed splits step 1130, the processor 205 applies rules to constrain allowed split types to each split option of the step 1110 to produce an allowed split list. When processing the luma coding tree, an allowed luma splits list 972 is created. The step 1130 operates according in the same manner as the step 1030 of the method 100 and thus the allowed split lists of nodes in the luma and chroma coding trees in the video decoder 134 are the same as the allowed split lists of nodes in the luma and chroma coding trees in the video encoder 114. The step 1030 operates to generate one of the lists of allowed splits 970 and 972 dependent upon whether the luma or chroma coding tree is being processed. As described in relation to step 1030 and FIG. 9, the chroma split options are different to the luma split options and the chroma split options result in blocks with a minimum size of 16 samples. Control in the processor 205 progresses to a QT/MT test step 1140.

At the QT/MT test step 1140 the processor 205 tests if the present node (region) is in the QT stage of the coding tree or the MT stage of the coding tree. If the present node is in the QT stage of the coding tree and the list of allowed splits includes the 'quad split' option (the split 512), control in the processor progresses to a decode QT split step 1155. If the present node is in the QT stage of the coding tree and the list of allowed splits does not include the 'quad split' option, i.e. only the 'no split' option is allowed, the coding tree stage shifts to the 'MT' stage and control in the processor 205 progresses to the zero allowed splits test 1150. If the coding tree is already in the MT stage, control in the processor 205 progresses to the zero allowed splits test 1150.

At the zero allowed splits test 1150 the processor 205 tests if the split option list, i.e. 970 or 972 for chroma and luma coding trees, respectively, contains only a 'no split' entry (510). If the split option list contains only a no split entry, then no further splits are possible and a CB exists at the current node. The step 1150 returns "YES" and control in the processor progresses to a decode coding block step 1170. If further splits are possible ("NO" at step 1150) then control in the processor progresses to a decode MT split step 1160.

At the decode QT split step 1055 the entropy decoder 420, under execution of the processor 205, decodes a QT split flag (i.e. 610) from the bitstream 133 indicating whether a division of the current node into four sub-modes, i.e. a quadtree split 512, is to occur. If a quadtree division is not to occur ("NO" at step 1155), control in the processor 205 progresses to the zero allowed splits test 1150. If a quadtree division is to occur ("YES" at step 1155), control in the processor 205 progresses to a recurse subregions step 11100.

At the decode MT split step 1060 the entropy decoder 420, under execution of the processor 205, decodes further flags from the bitstream 133 to indicate the type of MT split. If at least one split other than the 'no split' case is allowed, as determined at the step 1130, an MT split flag indicates the selection of a no split 510 (decode a '0' for an MT split flag, i.e. 612). The step 1060 returns "NO" and control in the processor 205 progresses to the decode coding block step 1170. Otherwise, the need to select of one of the splits 514-520 of the allowed splits (970 or 972) is indicated by decoding a '1' for the MT split flag, i.e. 612. The step 1060 returns "YES" and control in the processor 205 progresses to a decode B/T H/V split step 1190.

At the decode coding block step 1170 the entropy decoder 420, under execution of the processor 205, decodes the prediction mode and residual coefficients of the coding block from the bitstream 133. For intra predicted CBs, an intra-prediction mode is decoded and for inter predicted CBs, a motion vector is decoded. The residual coefficients are decoded according to a scan progressing from the last significant residual coefficient in the scan path back towards the DC coefficient of the block. Moreover, the coefficients are grouped into 'sub-blocks', for which a coded sub-block flag may be decoded indicating the presence of at least one significant residual coefficient in the sub-block. If no significant residual coefficients are present in the sub-block, there is no need to decode individual significance flags for each residual coefficient in the sub-block. The sub-block that contains the last significant residual coefficient does not require decoding of a sub-block flag and a coded sub-block flag is not decoded for the sub-block containing the DC (top left of the block) residual coefficient. Sub-block sizes are always 4×4 in luma and in chroma are one of 2×8 or 4×4 or 8×2 for a given block, as shown in FIG. 8. Thus, the sub-block size is always 16, which accords with block sizes that are always a multiple of 16, as is the case in the collection 800. Control in the processor 205 progresses to the last coding block test step 1180.

At the last coding block test 1180, the processor 205 determines whether the current coding block is the last CB in the coding tree. By virtue of the hierarchical Z-order scan, the last CB is the one occupying the lower-right corner of the CTU. If the current CB is the last one in the coding tree, the step 1180 returns "YES" and the method 1100 terminates. Once the method 1100 has decoded the luma coding tree, the method 1100 is invoked to decode the chroma coding tree. Otherwise, the current node progresses to the next one according to the hierarchical Z-order scan, as exemplified in FIGS. 7A and 7B. The step 1180 returns "NO" and control in the processor 205 progresses to the generate initial split options step 1110. To correctly parse the bitstream 133, the video decoder 134 typically reads flags and other syntax elements in the same order as they were written by the video encoder 113. However, other operations maybe performed in a different order and/or concurrently, provided their dependencies are met. For example, sets of operations, such as those for luma and chroma intra reconstruction, may be performed in parallel.

At the decode B/T H/V split step 1190 the entropy decoder 420, under execution of the processor 205, decodes additional flags from the bitstream 133 indicating which split of the allowed split list is to be performed by the video decoder 134. When the allowed split list includes only one split other than the 'no split' case, the one split needs to be performed, as there are no other alternatives. Accordingly, there is no need to decode additional flags to identify the split. Control in the processor 205 then progresses to the recurse subregions step 11100. When the list of allowed splits includes splits in both horizontal and vertical directions, decode a flag indicating the direction of the split from the bitstream 133. If the list of allowed splits includes both binary and ternary splits, a flag indicating the type (i.e. binary or ternary) of the split is decided from the bitstream 133. Control in the processor 205 progresses to the recurse subregions step 11100.

At the recurse subregions step 11100 the processor 205 subregions according to the determined split of the step 1190 or 1155 are generated and the method 1100 is invoked for each of these subregions or nodes, resulting in a recursion throughout the coding tree. Recursive invocation of the method 1100 progresses from one subregion or node to the next in accordance with a hierarchical Z-order scan of the coding tree, as shown in FIGS. 7A and 7B. If the child nodes resulting from a split have been processed to generate blocks or sub-regions, the recursion progresses to the next sibling node in the coding tree. If there are no further sibling nodes, the recursion progresses to the parent node or region. The next node (e.g. a sibling of the parent) is selected as the next node to process. If the parent node is in the QT stage of the coding tree, the return to a parent node results in returning to the QT stage of the coding tree.

Accordingly, steps 1155, 1160, 1190 and 1170 operate to decode the coding units of the coding tree unit by determining flags from the bitstream 133 to select one of the luma split options and one of the chroma split options determined at step 1130.

As a result of the methods 1000 and 1100 and in particular the steps 1030 and 1130, relatively small intra predicted blocks for the chroma channel that are difficult to process at a high rate in the intra reconstruction loop are avoided. Avoidance of the small blocks facilitates implementation at high resolution and/or frame rates, where the 'pixel rate' (pixels per second that need to be processed) is high without unacceptable degradation of quality.

Figure 12:
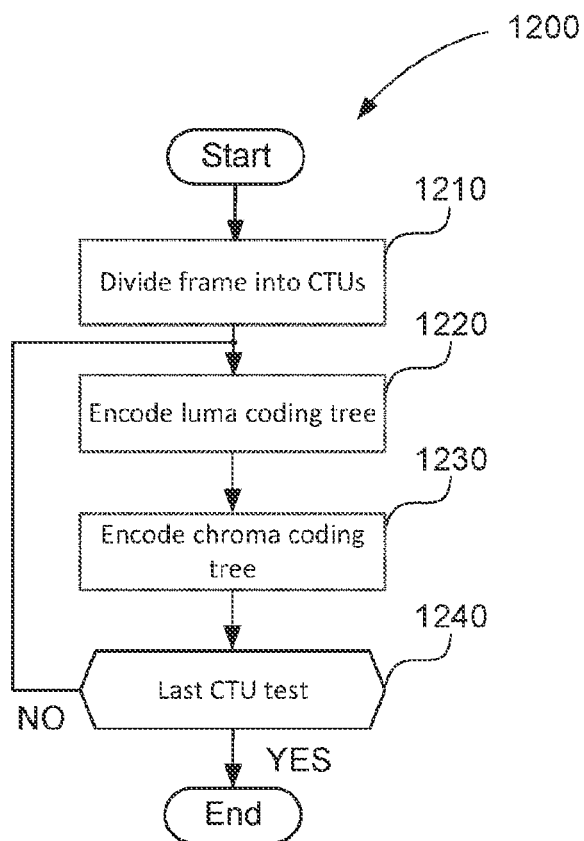
FIG. 12 is a flow diagram of a method for encoding luma and chroma coding trees of an image frame into a video bitstream.

FIG. 12 shows a method 1200 for encoding luma and chroma coding trees of an image frame into a video bitstream. The method 1200 may be embodied by apparatus such as a configured FPGA, an ASIC, or an ASSP. Additionally, the method 1200 may be performed by video decoder 114 under execution of the processor 205. As such, the method 1200 may be stored on computer-readable storage medium and/or in the memory 206. The method 1200 commences at a divide frame into CTUs step 1210.

At the divide frame into CTUs step 1210 the block partitioner 310, under execution of the processor 205, divides a current frame of the frame data 113 into an array of CTUs. A progression of encoding over the CTUs resulting from the division commences. Control in the processor progresses from the step 1210 to an encode luma coding tree step 1220.

At the encode luma coding tree step 1220 the video encoder 114, under execution of the processor 205, performs the method 1000 to determine and encode the luma coding tree of a current CTU into the bitstream 115. The current CTU is a selected one of the CTUs resulting from execution of step 1210. Control in the processor 205 progresses from the step 1220 to an encode chroma coding tree step 1230.

At the encode chroma coding tree step 1230 the video encoder 114, under execution of the processor 205, performs the method 1000 to determine and encode the chroma coding tree of the current CTU into the bitstream 115. Control in the processor 205 progresses from the step 1230 to a last CTU test step 1240.

At the last CTU test step 1240 the processor 205 tests if the current CTU is the last one in the slice or frame. If not ("NO" at step 1240), the video encoder 114 advances to the next CTU in the frame and control in the processor 205 progresses from the step 1240 back to the step 1220 to continue processing remaining CTUs in the frame. If the CTU is the last one in the frame or slice, the step 1240 returns "YES" and the method 1200 terminates.

Figure 13:
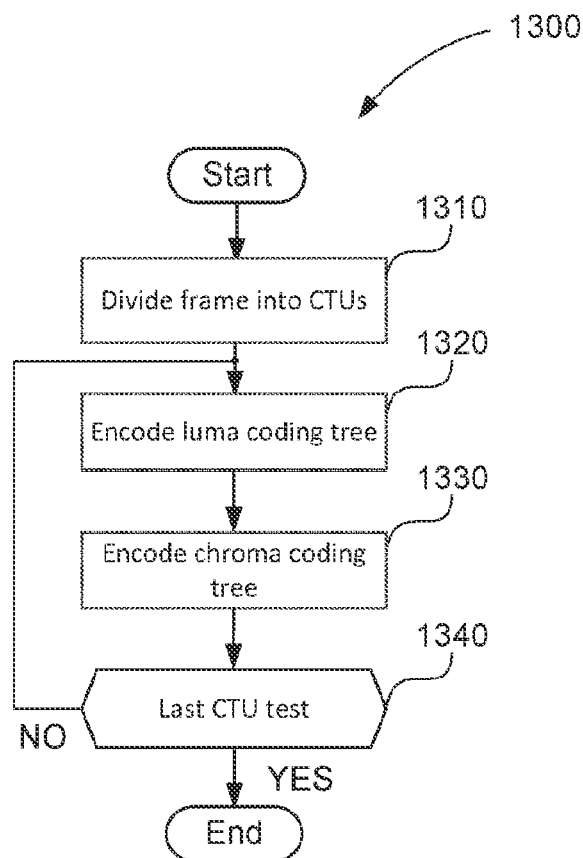
FIG. 13 is a flow diagram of a method for decoding luma and chroma coding trees of an image frame from a video bitstream.

FIG. 13 is a flow diagram of a method 1300 for decoding luma and chroma coding trees of an image frame from a video bitstream. The method 1300 may be embodied by apparatus such as a configured FPGA, an ASIC, or an ASSP. Additionally, the method 1300 may be performed by video decoder 134 under execution of the processor 205. As such, the method 1300 may be stored on computer-readable storage medium and/or in the memory 206. The method 1300 commences at a divide frame into CTUs step 1310.

At the divide frame into CTUs step 1310 the video decoder 134, under execution of the processor 205, determines a division of a current frame of the frame data 133 that is to be decoded into an array of CTUs. A progression of decoding over the CTUs resulting from the determined division commences. Control in the processor progresses from the step 1310 to an decode luma coding tree step 1320.

At the decode luma coding tree step 1320 the video decoder 134, under execution of the processor 205, performs the method 1100 a first time for the current CTU to decode the luma coding tree of the current CTU from the bitstream 133. The current CTU is a selected one of the CTUs resulting from execution of step 1310. Control in the processor 205 progresses from the step 1320 to a decode chroma coding tree step 1330.

At the decode chroma coding tree step 1330 the video decoder 134, under execution of the processor 205, performs the method 1100 a second time for the current CTU to decode the chroma coding tree of the current CTU from the bitstream 133. Control in the processor 205 progresses from the step 1330 to a last CTU test step 1340.

At the last CTU test step 1340 the processor 205 tests if the current CTU is the last one in the slice or frame. If not ("NO" at step 1340), the video decoder 134 advances to the next CTU in the frame and control in the processor 205 progresses from the step 1340 back to the step 1320 to continue decoding CTUs from the bitstream. If the CTU is the last one in the frame or slice, the step 1340 returns "YES" and the method 1300 terminates.

The grouping of residual coefficients into sub-blocks of size 16 (sixteen) facilitates implementation of the entropy encoder 338 and entropy decoder 420, for example using as described in relation to the TBs 816 and 823 of FIG. 8. In particular, grouping residual coefficients into sub-blocks of size 16 facilitates implementation of arithmetic coding of context coded bins, such as for the significance map, to allow use of a fixed pattern of contexts within each sub-block.

INDUSTRIAL APPLICABILITY

The arrangements described are applicable to the computer and data processing industries and particularly for the digital signal processing for the encoding a decoding of signals such as video and image signals, achieving high compression efficiency.

In contract to HEVC, VVC systems allow use of separate coding trees for luma and chroma channels for increased flexibility. However, as discussed above, a resultant issue can occur due use of smaller chroma blocks affecting throughput. The arrangements described herein determine appropriate rules as each coding tree unit is processed to assist in avoiding throughput issues. Additionally, as described above, the arrangements described can assist in providing improved efficiency and accuracy of arithmetic coding of context coded bins used to describe each coding trees, given the rules for avoiding throughput issues.

The foregoing describes only some embodiments of the present invention, and modifications and/or changes can be made thereto without departing from the scope and spirit of the invention, the embodiments being illustrative and not restrictive.

(Australia only) In the context of this specification, the word "comprising" means "including principally but not necessarily solely" or "having" or "including", and not "consisting only of". Variations of the word "comprising", such as "comprise" and "comprises" have correspondingly varied meanings.

The claim(s) defining the invention are as follows:

1. A method of decoding blocks of a coding tree unit in an image, from a bitstream, the method comprising:
   determining a chroma format of the image from a plurality of chroma formats;
   determining luma split options for a luma channel of the coding tree unit according to a size of a region in the coding tree unit;

determining chroma split options for chroma channels of the coding tree unit according to a size of a region in the coding tree unit, the chroma split options being capable of including a vertical ternary split and including a horizontal ternary split, wherein a tree structure for the chroma channels of the coding tree unit is separate from a tree structure for the luma channel of the coding tree unit, and the vertical ternary split for a given region in the coding tree unit is not allowed in the chroma split options in a case where (a) a width of the given region is 16 samples in luma samples and (b) the determined chroma format is a 4:2:2 chroma format or a 4:2:0 chroma format; and decoding flags from the bitstream to select one of the determined luma split options and one of the determined chroma split options.

2. The method according to claim 1, wherein a minimum size of chroma blocks, for intra prediction, obtained by the chroma split options is 16 samples.

3. The method according to claim 1, wherein the determined luma split options result in a luma block size that is a multiple of 16 samples for the luma channel of the image.

4. The method according to claim 1, wherein the determined luma split options result in a luma block size that is a multiple of 16 samples for the luma channel of the image, and an intra chroma block having a width of two samples are coded using a division of the intra chroma block into sub-blocks, each sub-block of size 2 by 8 samples.

5. The method according to claim 1, wherein the determined luma split options result in a luma block size that is a multiple of 16 samples for the luma channel of the image, and an intra chroma block having a height of two samples are coded using a division of the intra chromablock into sub-blocks, each sub-block of size 8 by 2 samples.

6. A method of encoding blocks of a coding tree unit in an image, into a bitstream, the method comprising:

determining a chroma format of the image from a plurality of chroma formats;

determining luma split options for a luma channel of the coding tree unit according to a size of a region in the coding tree unit;

determining chroma split options for chroma channels of the coding tree unit according to a size of a region in the coding tree unit, the chroma split options being capable of including a vertical ternary split and including a horizontal ternary split, wherein a tree structure for the chroma channels of the coding tree unit is separate from a tree structure for the luma channel of the coding tree unit, and the vertical ternary split for a given region in the coding tree unit is not allowed in the chroma split options in a case where (a) a width of the given region is 16 samples in luma samples and (b) the determined chroma format is a 4:2:2 chroma format or a 4:2:0 chroma format; and encoding flags used for selecting one of the determined luma split options and one of the determined chroma split options.

7. The method according to claim 6, wherein a minimum size of chroma blocks, for intra prediction, obtained by the chroma split options is 16 samples.

8. The method according to claim 6, wherein the determined luma split options result in a luma block size that is a multiple of 16 samples for the luma channel of the image.

9. The method according to claim 6, wherein the determined luma split options result in a luma block size that is a multiple of 16 samples for the luma channel of the image, and a intra chroma block having a width of two samples is coded using a division of the intra chroma block into sub-blocks, each sub-block of size 2 by 8 samples.

10. The method according to claim 6, wherein the determined luma split options result in a luma block size that is a multiple of 16 samples for the luma channel of the image, and an intra chroma block having a height of two samples is coded using a division of the intra chroma block into sub-blocks, each sub-block of size 8 by 2 samples.

11. A video decoding apparatus decoding blocks of a coding tree unit in an image from a bitstream, the video decoding apparatus comprising:

a first determining unit configured to determine a chroma format of the image from a plurality of chroma formats;

a second determining unit configured to determine luma split options for a luma channel of the coding tree unit according to a size of a region in the coding tree unit;

a third determining unit configured to determine chroma split options for chroma channels of the coding tree unit according to a size of a region in the coding tree unit, the chroma split options being capable of including a vertical ternary split and including a horizontal ternary split, wherein a tree structure for the chroma channels of the coding tree unit is separate from a tree structure for the luma channel of the coding tree unit, and the vertical ternary split for a given region in the coding tree unit is not allowed in the chroma split options in a case where (a) a width of the given region is 16 samples in luma samples and (b) the determined chroma format is a 4:2:2 chroma format or a 4:2:0 chroma format; and a decoding unit configured to decode flags from the bitstream to select one of the determined luma split options and one of the determined chroma split options.

12. An encoding apparatus encoding blocks of a coding tree unit in an image, the encoding apparatus comprising:

a first determining unit configured to determine a chroma format of the image from a plurality of chroma formats;

a second determining unit configured to determine luma split options for a luma channel of the coding tree unit according to a size of a region in the coding tree unit;

a third determining unit configured to determine chroma split options for chroma channels of the coding tree unit according to a size of a region in the coding tree unit, the chroma split options being capable of including a vertical ternary split and including a horizontal ternary split, wherein a tree structure for the chroma channels of the coding tree unit is separate from a tree structure for the luma channel of the coding tree unit, and the vertical ternary split for a given region in the coding tree unit is not allowed in the chroma split options in a case where (a) a width of the given region is 16 samples in luma samples and (b) the determined chroma format is a 4:2:2 chroma format or a 4:2:0 chroma format; and an encoding unit configured to encode flags used for selecting one of the determined luma split options and one of the determined chroma split options.

13. A non-transitory computer-readable storage medium storing a program for causing a computer to execute a method of decoding blocks of a coding tree unit in an image, from a bitstream, the method comprising:

determining a chroma format of the image from a plurality of chroma formats;

determining luma split options for a luma channel of the coding tree unit according to a size of a region in the coding tree unit;

determining chroma split options for chroma channels of the coding tree unit according to a size of a region in the coding tree unit, the chroma split options being capable of including a vertical ternary split and including a horizontal ternary split, wherein a tree structure for the chroma channels of the coding tree unit is separate from a tree structure for the luma channel of the coding tree unit, and the vertical ternary split for a given region in the coding tree unit is not allowed in the chroma split options in a case where (a) a width of the given region is 16 samples in luma samples and (b) the determined chroma format is a 4:2:2 chroma format or a 4:2:0 chroma format; and decoding flags from the bitstream to select one of the determined luma split options and one of the determined chroma split options.

14. A non-transitory computer-readable storage medium storing a program for causing a computer to execute a method of encoding blocks of a coding tree unit in an image, into a bitstream, the method comprising:

determining a chroma format of the image from a plurality of chroma formats;

determining luma split options for a luma channel of the coding tree unit according to a size of a region in the coding tree unit;

determining chroma split options for chroma channels of the coding tree unit according to a size of a region in the coding tree unit, the chroma split options being capable of including a vertical ternary split and including a horizontal ternary split, wherein a tree structure for the chroma channels of the coding tree unit is separate from a tree structure for the luma channel of the coding tree unit, and the vertical ternary split for a given region in the coding tree unit is not allowed in the chroma split options in a case where (a) a width of the given region is 16 samples in luma samples and (b) the determined chroma format is a 4:2:2 chroma format or a 4:2:0 chroma format; and encoding flags used for selecting one of the determined luma split options and one of the determined chroma split options.

* * * * *